US011616650B1

(12) United States Patent
Panjwani et al.

(10) Patent No.: US 11,616,650 B1
(45) Date of Patent: Mar. 28, 2023

(54) PHYSIO-DIGITAL NON-FUNGIBLE TOKEN SYSTEM

(71) Applicant: LIQUIDSports, Inc., Hillsborough, CA (US)

(72) Inventors: Danyal Panjwani, Hillsborough, CA (US); Jack Bonomo, Hillsborough, CA (US)

(73) Assignee: LIQUIDSports, Inc., Hillsborough, CA (US)

( * ) Notice: Subject to any disclaimer, the term of this patent is extended or adjusted under 35 U.S.C. 154(b) by 0 days.

(21) Appl. No.: 17/549,539

(22) Filed: Dec. 13, 2021

(51) Int. Cl.
| | |
|---|---|
| *H04L 29/06* | (2006.01) |
| *H04L 9/32* | (2006.01) |
| *G06N 20/00* | (2019.01) |
| *H04L 67/1097* | (2022.01) |
| *H04L 9/00* | (2022.01) |

(52) U.S. Cl.
CPC .......... *H04L 9/3213* (2013.01); *G06N 20/00* (2019.01); *H04L 9/3236* (2013.01); *H04L 9/3247* (2013.01); *H04L 67/1097* (2013.01); *H04L 9/50* (2022.05); *H04L 2209/56* (2013.01)

(58) Field of Classification Search
CPC ... H04L 9/3213; H04L 9/3236; H04L 9/3247; H04L 67/1097; H04L 9/50; H04L 2209/56; G06N 20/00
See application file for complete search history.

(56) References Cited

U.S. PATENT DOCUMENTS

| 6,640,232 | B2 | 10/2003 | Kernz | |
| 9,575,724 | B1* | 2/2017 | Liberatori, Jr. | ...... G06Q 20/023 |
| 11,032,072 | B2 | 6/2021 | Andon et al. | |
| 2008/0023351 | A1* | 1/2008 | Macor | .................... B65D 85/58 |
| | | | | 206/0.8 |
| 2008/0223930 | A1* | 9/2008 | Rolland | ............... G06Q 10/087 |
| | | | | 235/385 |
| 2018/0005465 | A1* | 1/2018 | Truong | .............. G06Q 10/0833 |
| 2020/0042989 | A1 | 2/2020 | Ramadoss et al. | |
| 2020/0273048 | A1* | 8/2020 | Andon | ................. G06Q 20/045 |
| 2021/0035092 | A1 | 2/2021 | Pierce et al. | |
| 2021/0281410 | A1* | 9/2021 | Hain | .................... G06Q 20/065 |
| 2021/0390531 | A1* | 12/2021 | Voorhees | ............. G06Q 20/065 |
| 2022/0027992 | A1 | 1/2022 | Blevins | |
| 2022/0036371 | A1* | 2/2022 | Frisbee | ................ G06Q 30/018 |

(Continued)

FOREIGN PATENT DOCUMENTS

WO    WO2022025634    *    7/2021

OTHER PUBLICATIONS

Dibbs: There's Action in the Cards [online] Dibbs, 2022 [retrieved on Feb. 2, 2022]. Retrieved from the Internet: <https://dibbs.io/>.

(Continued)

*Primary Examiner* — Taghi T Arani
*Assistant Examiner* — Lin Chang
(74) *Attorney, Agent, or Firm* — Pillsbury Winthrop Shaw Pittman, LLP

(57) ABSTRACT

Provided is a process including: generating a non-fungible token according to a non-fungible token standard; associating a virtual display of a physical object with the non-fungible token; associating object content associated with the physical object with the non-fungible token; and storing the non-fungible token at a first blockchain address of a first blockchain.

22 Claims, 11 Drawing Sheets

(56) References Cited

U.S. PATENT DOCUMENTS

2022/0076221 A1* 3/2022 Chiapetta ......... G06Q 20/38215

OTHER PUBLICATIONS

AtomicAssets [online], Pink.gg, 2022 [retrieved on Feb. 2, 2022]. Retrieved from the Internet: <https://atomicassets.io/>.

Dibbs—The first 24/7 marketplace for trading fractions of collectibles, Dibbs User Agreement [online]. Dibbs, 2022 [retrieved on Feb. 2, 2022]. Retrieved from the Internet: <https://alpha1.dibbs.io/user-agreement>.

* cited by examiner

PHYSIO-DIGITAL NON-FUNGIBLE TOKEN SYSTEM

BACKGROUND

1. Field

The present disclosure generally relates to blockchain technology, and more specifically, the present disclosure relates to systems and methods for tokenizing a physical object in a blockchain environment and verifying possession and maintenance of ownership, according to various embodiments.

2. Description of the Related Art

Some blockchains feature smart contract functionality and include a decentralized replicated virtual machine that may execute smart contracts such as scripts and decentralized applications. Various types of tokens may be generated on these blockchains by these smart contracts for various purposes. However, these tokens are limited in their capabilities and functionality with respect to bridging the physical world with a virtual environment and tokens are limited in their use.

SUMMARY

The following is a non-exhaustive listing of some aspects of the present techniques. These and other aspects are described in the following disclosure.

Some aspects include a process including: generating a non-fungible token according to a non-fungible token standard; associating a virtual display of a physical object with the non-fungible token; associating object content associated with the physical object with the non-fungible token; and storing the non-fungible token at a first blockchain address of a first blockchain.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
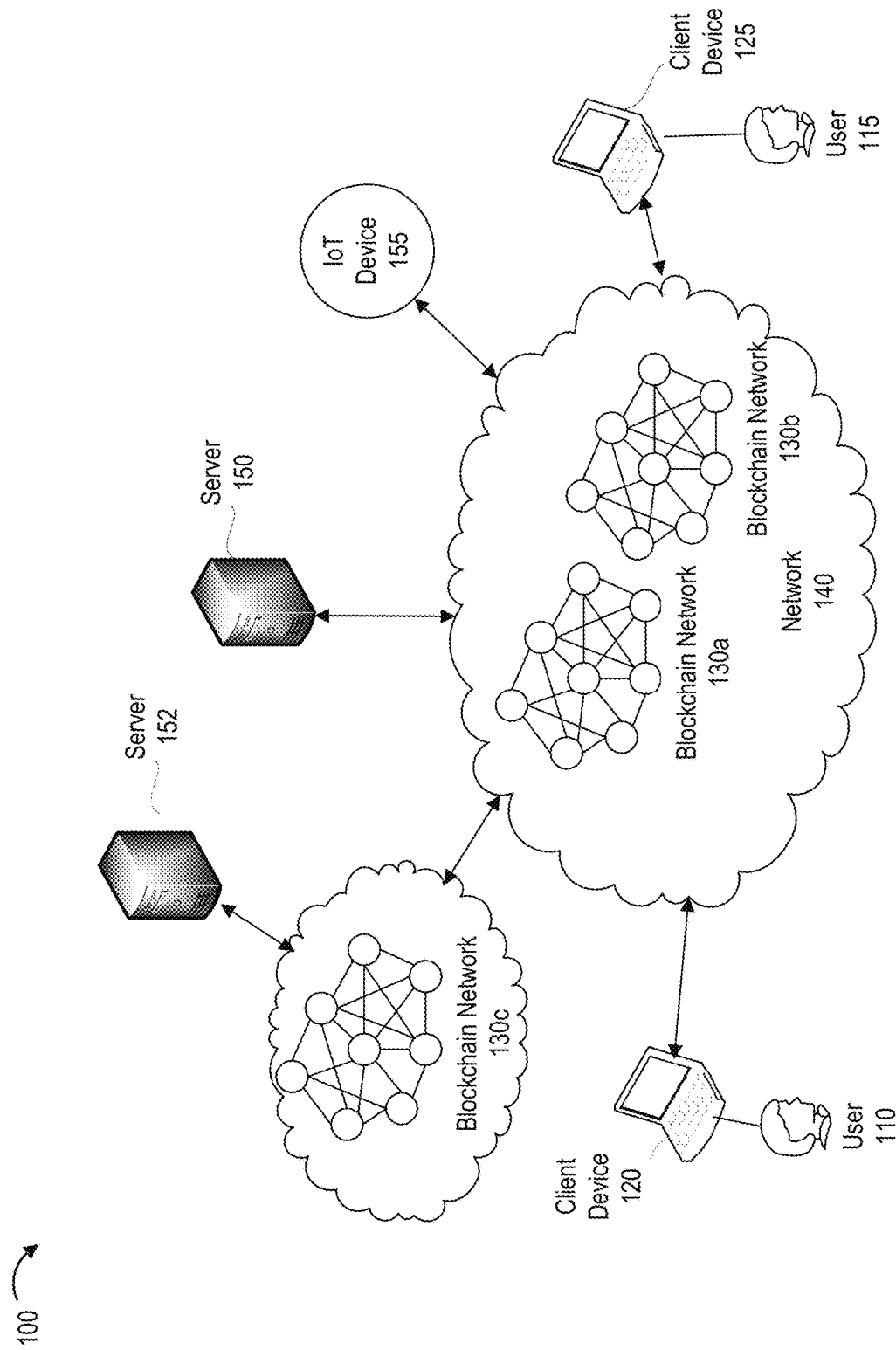
FIG. 1 illustrates a block diagram illustrating a computing architecture for facilitating one or more blockchain based transactions, in accordance with some embodiments of the present disclosure.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of token generation on a blockchain network. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

In various embodiments of the present disclosure, systems and methods are disclosed for generating a non-fungible token that is associated with a physical object such that the non-fungible token is associated with a virtual display of that physical object and object content that is associated with that physical object as well as the physical object itself. A physio-digital non-fungible token may be generated. The physio-digital non-fungible token may include a non-fungible token and a physical object on which the non-fungible token is stored in a storage device coupled to the physical object. A physio-digital non-fungible tokens generated in accordance embodiments of the present disclosure may also be associated with a virtualization of the physical object (e.g., a virtual display that need not actually be displayed but may be a representation or version of the physical object) and content associated with the physical object that enriches user experiences and applications by having possession of that physio-digital non-fungible token. Embodiments herein also contemplate a vault system used to (1) transport the physical object or digital-physio non-fungible token, (2) participate in the tokenization process to provide a safer, more efficient tokenization process, and (3) facilitate trades and transactions that transfer ownership of physio-digital non-fungible tokens between users.

For example, the systems and methods of the present disclosure may be used to tokenize sports memorabilia and other physical collectible objects into digital-physio non-fungible tokens. In a specific example, the sports memorabilia may include a sports card. The user may provide the sports card to a physio-digital tokenization service provider. In some examples, the user may provide the sports card to the physio-digital tokenization service provider in a vault device.

The vault device may be a portable, lightweight, digital, biometric and cryptographically enabled, safe-deposit box. The vault device may include a storage device such as a Radio Frequency Identifier (RFID) tag (e.g., a UCODE DNA chip by NXP® Semiconductors N.V., headquartered in Eindhoven, Netherlands). In various embodiments, the vault device may be waterproof, fireproof, and tamperproof. The vault device may include a positioning system such as a Global Position System (GPS) and a communication system that reports, via a network, a geolocation of the vault device to the physio-digital tokenization service provider. The vault device may include a plurality of sensors such as a temperature sensor, an accelerometer, a gyroscope, and other sensors that detect environmental conditions internal and/or external the vault device. The vault device may include an Input/Output system (I/O system) that may include a fingerprint reader, a camera for a facial recognition application, a display device, a keypad, and/or other I/O systems. The vault device may include a non-transitory memory system that includes instructions that, when run by a processor included on a processing system included with the vault device, perform operations for verification of relinquishment of possession of a physio-digital token, the physical object associated with the physio-digital token, and/or a token of the physio-digital token as well as other functionality discussed in below.

When the sports card is received by the physio-digital tokenization service provider (e.g., via receiving and accessing the vault device), the physio-digital tokenization service provider may generate a virtual display of the sports card by, for example, scanning a front side and a back side of the sports card and combining the resulting images. In other embodiments, the virtual display may be manipulated such that it is not an exact representation of the sports card to avoid copyright issues. In various embodiments, the virtual display may include a microscopic three-dimensional manipulatable/rotatable image. The virtual display may be associated with a user account of a physio-digital tokenization service provider application. The physical object may be implanted with a tamper-proof UCODE DNA chip or other RFID tag or other data storage device. Object content associated with the physical object may be obtained. The object content may include content, such as primary content obtained from the physical card itself (e.g., a player identifier, a state, a season of the card, a brand of card), secondary content obtained using the primary content obtained from the physical card (e.g., video content from a third-party associated with the season of the card and the player identifier), and/or content derived from the primary content and/or the secondary content (e.g., a grade value that is derived using the images of the card and a grading machine learning algorithm that grades the sports card based on the condition of the card). The virtual display and/or a file location of the virtual display along with at least a portion of object content and/or a file location for the object content may be associated with a generated non-fungible token and/or stored on a UCODE DNA that is implanted or otherwise coupled with the physical object. By storing the non-fungible token on the physical object, this creates the physio-digital non-fungible token. The physical object/physio-digital non-fungible token may be placed back in the vault device and/or otherwise provided back to the user. In various embodiments, the user may remove the physical object/physio-digital non-fungible token from the vault device, which may be confirmed by the vault device, a user computing device associated with the user, and/or any other device. In response, the non-fungible token associated with the physical object may be generated or otherwise stored on a blockchain.

In some embodiments, verifying possession and maintenance of the ownership of the physio-digital non-fungible token may be performed by transferring the physio-digital non-fungible token to device such as another vault device, a shelf, a desk, a rack, a book, a binder, a box, and/or other container or storage system that is associated with the user, a verified location, and/or the like and that can detect a the presence of the physio-digital non-fungible token. The verification and ownership maintenance device may include a communication system that may report the presence of the physio-digital non-fungible token to a smart contract on the blockchain used for verifying possession and maintenance of the ownership of the physio-digital non-fungible token. Verifying possession may be performed using proof-of-storage techniques or other proving schemes that would be apparent to one of skill in the art in possession of the present disclosure.

In various embodiments, the user may use the physio-digital non-fungible token in an application. For example, the physio-digital non-fungible token may be used by the user in a battle application where a user "battles" their physio-digital non-fungible token by selecting the physio-digital non-fungible token from their collection of physio-digital non-fungible tokens and challenge another user to a battle. The battle application may select a random game from the season of the sports player associated with the physio-digital non-fungible token, and those statistics may be used to determine the winner of the competition. A battle will take both physio-digital non-fungible tokens and display a full video summary of both random games and accrue points for both physio-digital non-fungible token based on the performances within each game. The user whose physio-digital non-fungible token accrued more points based on the player performance will win the battle and may win cryptocurrency associated with the battle application.

In various embodiments, a first user and a second user may enter a transaction such that the first user is transferring ownership of both the physio-digital non-fungible token to the second user or one of the physical object and the non-fungible token associated with the physical object. The vault device may be used to facilitate the transaction securely. For example, when transactions are made, the vault device is shipped to the first user who opens the vault device after having provided dual-authenticated identity. For example, dual-authentication may be performed at each point of transfer (e.g., relinquishing and gaining possession of the physical object and/or the physio-digital non-fungible token). In various examples, the dual-authentication may include a biometric authentication (e.g., a fingerprint authentication) on the blockchain and a user device authentication that may also be on the blockchain. An RFID reader/writer included with the vault device may detect the presence of the physical object and/or the physio-digital non-fungible token when the physical object is locked in the vault device and/or when the physical object and/or the physio-digital non-fungible token is removed from the vault device, which may cause the vault device to confirm that the first user is relinquishing possession of the physical object and/or the physio-digital non-fungible token and/or the second user is gaining possession of the physical object and/or the physio-digital non-fungible token on the blockchain, respectively.

In the following description of the various embodiments, reference is made to the accompanying drawings identified above and which form a part hereof, and in which is shown by way of illustration various embodiments in which aspects described herein may be practiced. It is to be understood that other embodiments may be utilized, and structural and functional modifications may be made without departing from the scope described herein. Various aspects are capable of other embodiments and of being practiced or being carried out in various different ways.

In its broadest sense, blockchain refers to a framework that supports a trusted ledger that is stored, maintained, and updated in a distributed manner in a peer-to-peer network. For example, in a cryptocurrency application, such as Bitcoin or Ethereum, Ripple, Dash, Litecoin, Dogecoin, zCash, Tether, Bitcoin Cash, Cardano, Stellar, EOS, NEO, NEM, Bitshares, Decred, Augur, Komodo, PIVX, Waves, Steem, Monero, Golem, Stratis, Bytecoin, Ardor, or in digital currency exchanges, such as Coinbase, Kraken, CEX.IO, Shapeshift, Poloniex, Bitstamp, Coinmama, Bisq, LocalBitcoins, Gemini and others where the distributed ledger represents each transaction and where units of the cryptocurrency are transferred between entities. For example, using a digital currency exchange, a user may buy any value of digital currency or exchange any holdings in digital currencies into worldwide currency or other digital currencies. Each transaction can be verified by the distributed ledger and only verified transactions are added to the ledger. (Note that other digital asset transfers are enabled by other blockchain schemes as well; cryptocurrency examples are used variously herein for ease of illustration and understanding) The ledger, along with many aspects of blockchain, may be referred to as "decentralized" in that a central authority is typically not present. Because of this, the accuracy and integrity of the ledger cannot be attacked at a single, central location. Modifying the ledger at all, or a majority of, locations where it is stored is made difficult so as to protect the integrity of the ledger. This is due in large part because individuals associated with the nodes that make up the peer-to-peer network have a vested interest in the accuracy of the ledger. Many uses of blockchain distributed ledgers other than cryptocurrency are possible, of course, as further discussed below.

Though maintaining cryptocurrency transactions in the distributed ledger may be the most recognizable use of blockchain technology today, the ledger may be used in a variety of different fields. Indeed, blockchain technology is applicable to any application where data of any type may be accessed where the accuracy of the data is assured. For example, a supply chain may be maintained in a blockchain ledger, where the transfer of each component from party to party, and location to location, may be recorded in the ledger for later retrieval. Doing so allows for easier identification of a source for a defective part and where other such defective parts have been delivered. Similarly, food items may be tracked in like manner from farm to grocery store to purchaser. Other data as well as other digital assets may be maintained, recorded, and/or transferred according to various blockchain schemes.

Implementations of the present disclosure will now be described in detail with reference to the accompanying Figures.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof Computing Architecture As discussed above, the distributed ledger in a blockchain framework is stored, maintained, and updated in a peer-to-peer network. In one example the distributed ledger maintains a number of blockchain transactions. FIG. 1 shows an example system 100 for facilitating a blockchain transaction. The physio-digital non-fungible token system 100 includes a first client device 120, a second client device 125, a first server 150, and an Internet of Things (IoT) device 155 interconnected via a network 140. The first client device 120, the second client device 125, the first server 150 may be a computing system 1000 described in more detail with reference to FIG. 10. The IoT device 155 may comprise any of a variety of devices including vehicles, home appliances, embedded electronics, software, sensors, actuators, thermostats, light bulbs, door locks, refrigerators, RFID implants, RFID tags, pacemakers, wearable devices, smart home devices, cameras, trackers, pumps, POS devices, and stationary and mobile communication devices along with connectivity hardware configured to connect and exchange data. For example, as discussed herein, the IoT device 155 may comprise a vault device and/or a physical object that is being tokenized. The network 140 may be any of a variety of available networks, such as the Internet, and represents a worldwide collection of networks and gateways to support communications between devices connected to the network 140. The physio-digital non-fungible token system 100 may also comprise one or more distributed or peer-to-peer (P2P) networks, such as a first, second, and third blockchain network 130a-c (generally referred to as blockchain networks 130). As shown in FIG. 1, the network 140 may comprise the first and second blockchain networks 130a and 130b. The third blockchain network 130c may be associated with a private blockchain as described below with reference to FIG. 2, and is thus, shown separately from the first and second blockchain networks 130a and 130b. Each blockchain network 130 may comprise a plurality of interconnected devices (or nodes) as described in more detail with reference to FIG. 2. As discussed above, a ledger, or blockchain, is a distributed database for maintaining a growing list of records comprising any type of information. A blockchain, as described in more detail with reference to FIG. 3, may be stored at least at multiple nodes (or devices) of the one or more blockchain networks 130.

In one example, a blockchain based transaction may generally involve a transfer of data or value between entities, such as the first user 110 of the first client device 120 and the second user 115 of the second client device 125 in FIG. 1. The server 150 may include one or more applications, for example, a transaction application configured to facilitate the transaction between the entities by utilizing a blockchain associated with one of the blockchain networks 130. As an example, the first user 110 may request or initiate a transaction with the second user 115 via a user application executing on the first client device 120. The transaction may be related to a transfer of value or data from the first user 110 to the second user 115. The first client device 120 may send a request of the transaction to the server 150. The server 150 may send the requested transaction to one of the blockchain networks 130 to be validated and approved as discussed below.

Blockchain Network

Figure 2:
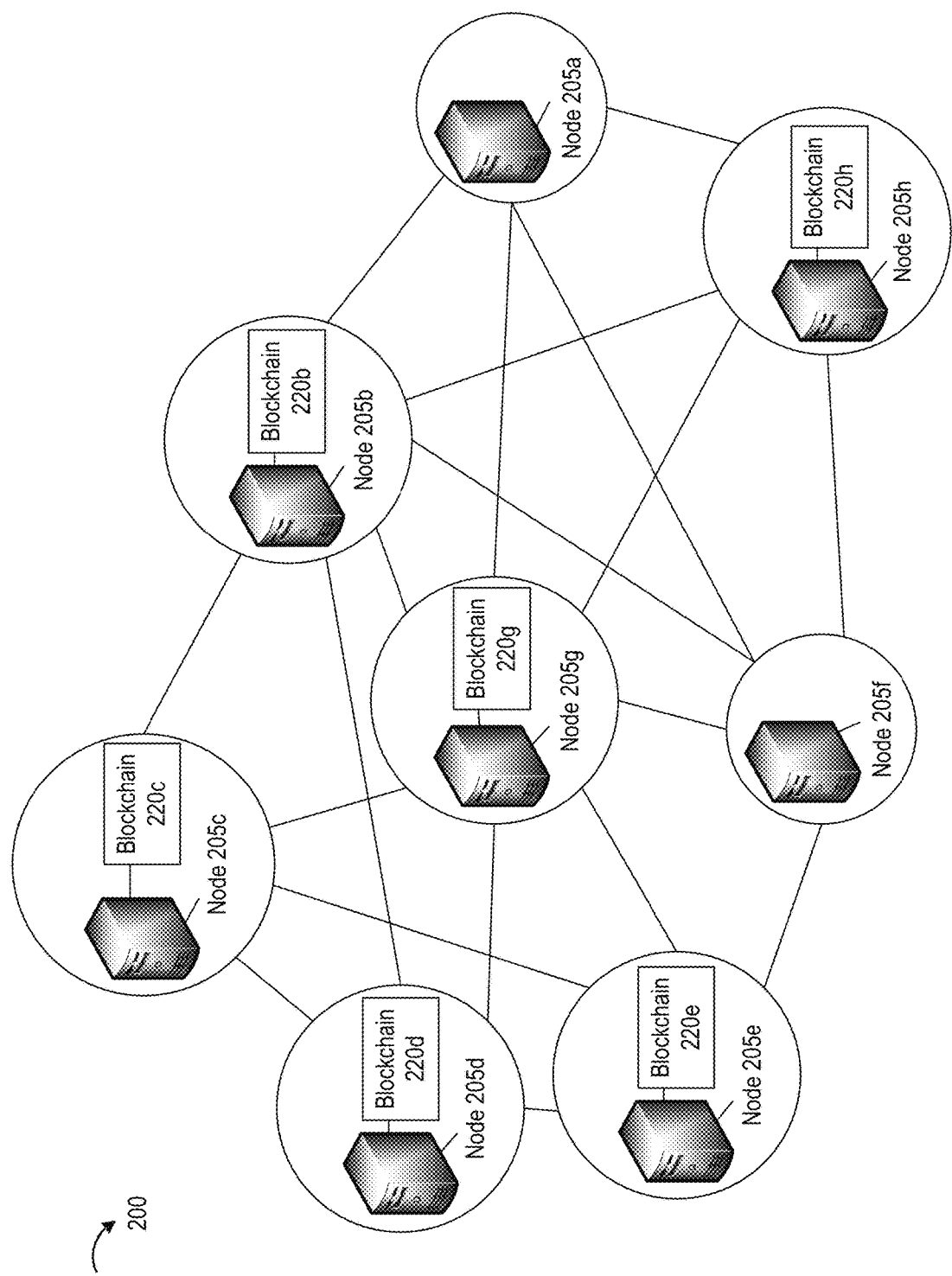
FIG. 2 illustrates a block diagram illustrating an example blockchain network of the computer architecture of FIG. 1, in accordance with some embodiments of the present disclosure.
Figure 3:
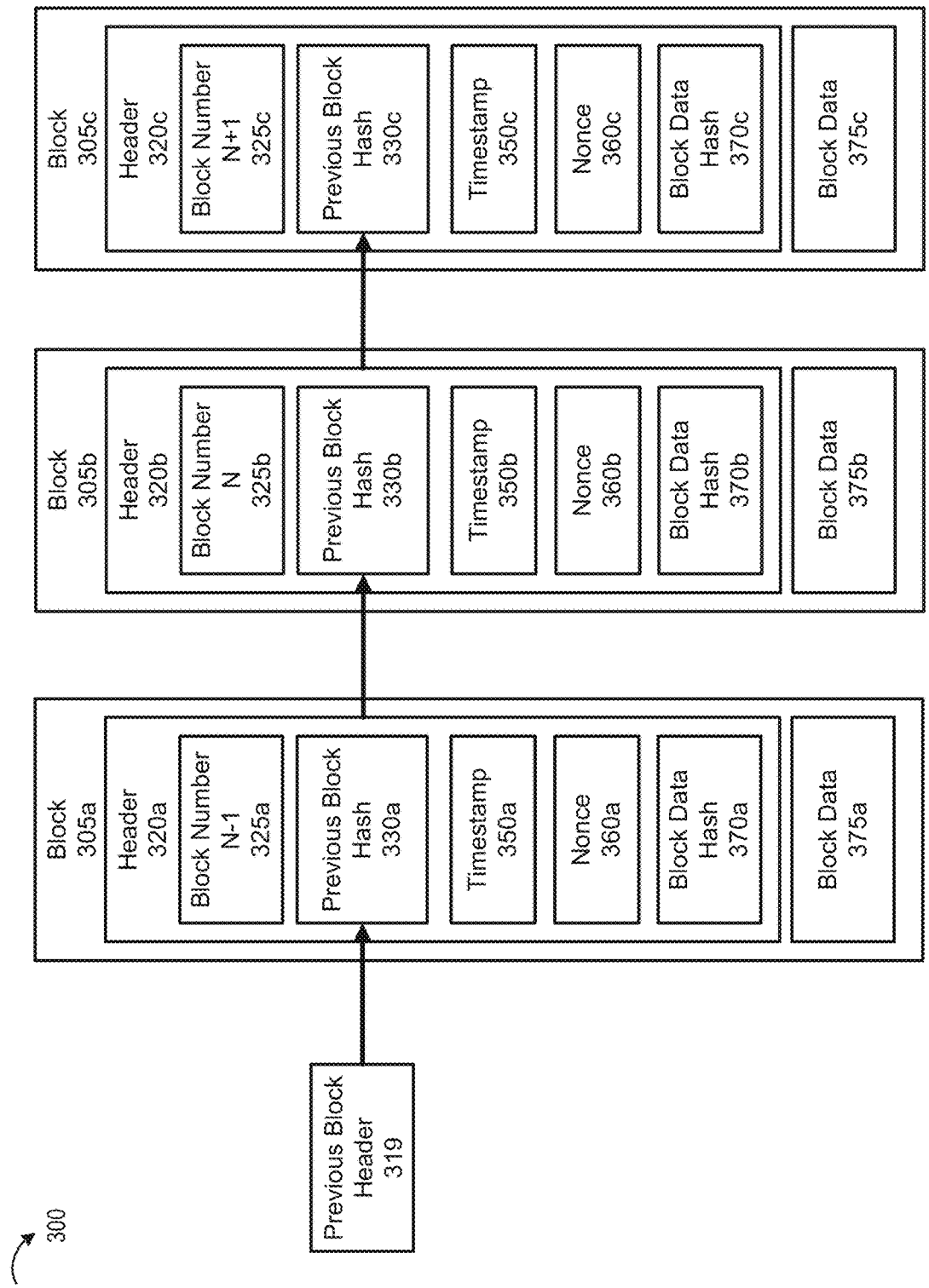
FIG. 3 illustrates a schematic illustrating an example blockchain, in accordance with some embodiments of the present disclosure.

FIG. 2 shows an example blockchain network 200 comprising a plurality of interconnected nodes or devices 205*a-h* (generally referred to as nodes 205). Each of the nodes 205 may comprise a computing system 1000 described in more detail with reference to FIG. 10. Although FIG. 2 shows a single device, each of the nodes 205 may comprise a plurality of devices (e.g., a pool). The blockchain network 200 may be associated with a blockchain 220. Some or all of the nodes 205 may replicate and save an identical copy of the blockchain 220. For example, FIG. 3 shows that the nodes 205*b-e* and 205*g-h* store copies of the blockchain 220. The nodes 205*b-e* and 205*g-h* may independently update their respective copies of the blockchain 220 as discussed below.

Blockchain Node Types

Blockchain nodes, for example, the nodes 205, may be full nodes or lightweight nodes. Full nodes, such as the nodes 205*b-e* and 205*g-h*, may act as a server in the blockchain network 200 by storing a copy of the entire blockchain 220 and ensuring that transactions posted to the blockchain 220 are valid. The full nodes 205*b-e* and 205*g-h* may publish new blocks on the blockchain 220. Lightweight nodes, such as the nodes 205*a* and 205*f*, may have fewer computing resources than full nodes. For example, IoT devices often act as lightweight nodes. The lightweight nodes may communicate with other nodes 205, provide the full nodes 205*b-e* and 205*g-h* with information, and query the status of a block of the blockchain 220 stored by the full nodes 205*b-e* and 205*g-h*. In this example, however, as shown in FIG. 2, the lightweight nodes 205*a* and 205*f* may not store a copy of the blockchain 220 and thus, may not publish new blocks on the blockchain 220.

Blockchain Network Types

The blockchain network 200 and its associated blockchain 220 may be public (permissionless), federated or consortium, or private. If the blockchain network 200 is public, then any entity may read and write to the associated blockchain 220. However, the blockchain network 200 and its associated blockchain 220 may be federated or consortium if controlled by a single entity or organization. Further, any of the nodes 205 with access to the Internet may be restricted from participating in the verification of transactions on the blockchain 220. The blockchain network 200 and its associated blockchain 220 may be private (permissioned) if access to the blockchain network 200 and the blockchain 220 is restricted to specific authorized entities, for example organizations or groups of individuals. Moreover, read permissions for the blockchain 220 may be public or restricted while write permissions may be restricted to a controlling or authorized entity.

Blockchain

As discussed above, a blockchain 220 may be associated with a blockchain network 200. FIG. 3 shows an example blockchain 300. The blockchain 300 may comprise a plurality of blocks 305*a*, 305*b*, and 305*c* (generally referred to as blocks 305). The blockchain 300 comprises a first block (not shown), sometimes referred to as the genesis block. Each of the blocks 305 may comprise a record of one or a plurality of submitted and validated transactions. The blocks 305 of the blockchain 300 may be linked together and cryptographically secured. In some cases, the post-quantum cryptographic algorithms that dynamically vary over time may be utilized to mitigate ability of quantum computing to break present cryptographic schemes. Examples of the various types of data fields stored in a blockchain block are provided below. A copy of the blockchain 300 may be stored locally, in the cloud, on grid, for example by the nodes 205*b-e* and 205*g-h*, as a file or in a database.

Blocks

Each of the blocks 305 may comprise one or more data fields. The organization of the blocks 305 within the blockchain 300 and the corresponding data fields may be implementation specific. As an example, the blocks 305 may comprise a respective header 320*a*, 320*b*, and 320*c* (generally referred to as headers 320) and block data 375*a*, 375*b*, and 375*c* (generally referred to as block data 375). The headers 320 may comprise metadata associated with their respective blocks 305. For example, the headers 320 may comprise a respective block number 325*a*, 325*b*, and 325*c*. As shown in FIG. 3, the block number 325*a* of the block 305*a* is N−1, the block number 325*b* of the block 305*b* is N, and the block number 325*c* of the block 305*c* is N+1. The headers 320 of the blocks 305 may include a data field comprising a block size (not shown).

The blocks 305 may be linked together and cryptographically secured. For example, the header 320*b* of the block N (block 305*b*) includes a data field (previous block hash 330*b*) comprising a hash representation of the previous block N−1's header 320*a*. The hashing algorithm utilized for generating the hash representation may be, for example, a secure hashing algorithm 256 (SHA-256) which results in an output of a fixed length. In this example, the hashing algorithm is a one-way hash function, where it is computationally difficult to determine the input to the hash function based on the output of the hash function. Additionally, the header 320*c* of the block N+1 (block 305*c*) includes a data field (previous block hash 330*c*) comprising a hash representation of block N's (block 305*b*) header 320*b*.

The headers 320 of the blocks 305 may also include data fields comprising a hash representation of the block data, such as the block data hash 370*a-c*. The block data hash 370*a-c* may be generated, for example, by a Merkle tree and by storing the hash or by using a hash that is based on all of the block data. The headers 320 of the blocks 305 may comprise a respective nonce 360*a*, 360*b*, and 360*c*. In some implementations, the value of the nonce 360*a-c* is an arbitrary string that is concatenated with (or appended to) the hash of the block. The headers 320 may comprise other data, such as a difficulty target.

The blocks 305 may comprise a respective block data 375*a*, 375*b*, and 375*c* (generally referred to as block data 375). The block data 375 may comprise a record of validated transactions that have also been integrated into the blockchain network 200 via a consensus model (described below). As discussed above, the block data 375 may include a variety of different types of data in addition to validated transactions. Block data 375 may include any data, such as text, audio, video, image, tokens (e.g., fungible or non-fungible) or file, that may be represented digitally and stored electronically.

Blockchain Transaction

In one example, a blockchain based transaction may generally involve a transfer of data or value or an interaction between entities and described in more detail below. Referring back to FIG. 1, the server 150 may include one or more applications, for example, a transaction application configured to facilitate a blockchain transaction between entities. The entities may include users, devices, etc. The first user 110 may request or initiate a transaction with the second user 115 via a user application executing on the first client device 120. The transaction may be related to a transfer of value or data from the first user 110 to the second user 115. The value or data may represent money, a contract, property, records, rights, status, supply, demand, alarm, trigger, or any other asset that may be represented in digital form. The transaction may represent an interaction between the first user 110 and the second user 115.

Figure 4:
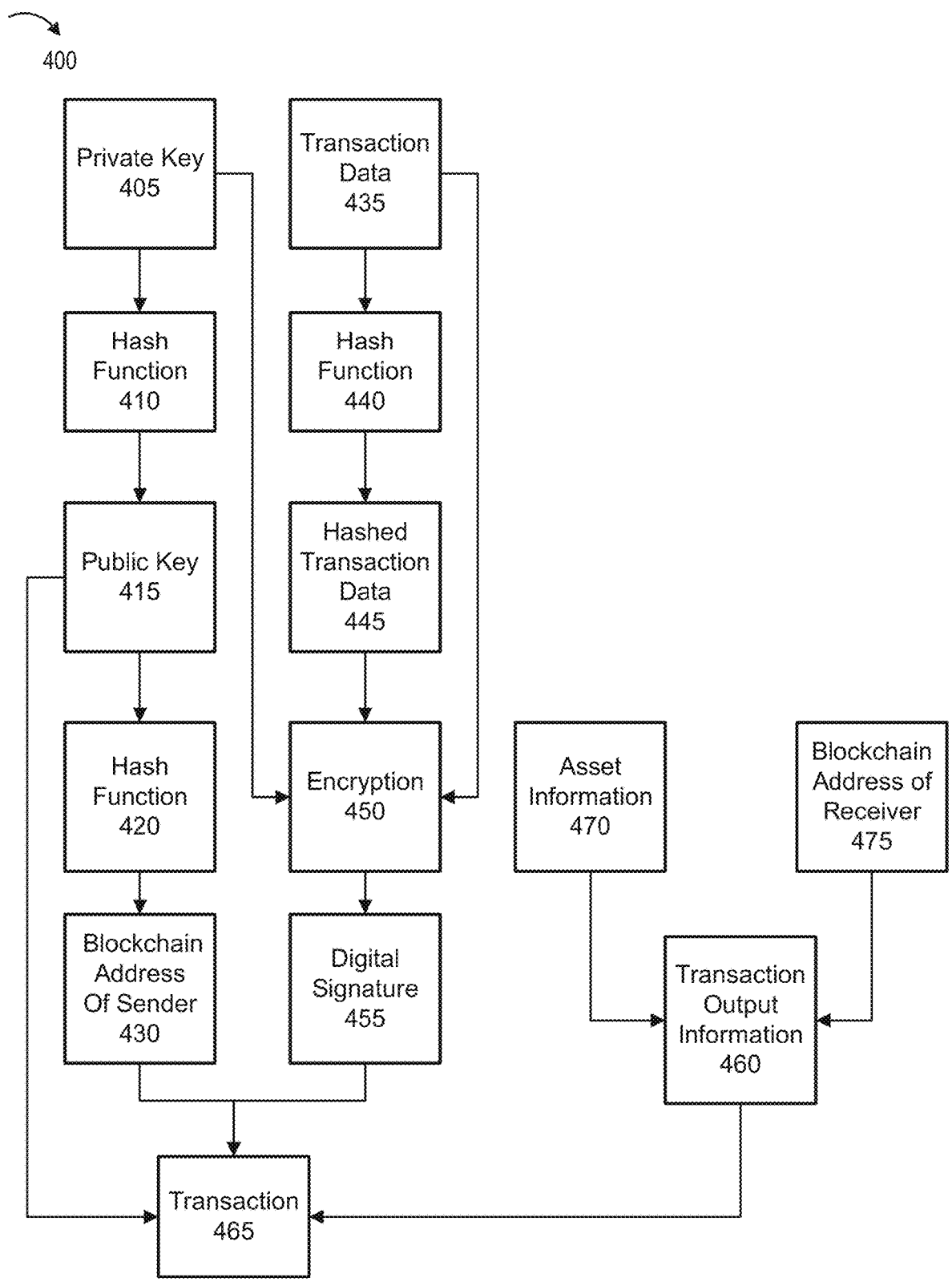
FIG. 4 illustrates a diagram of an example transaction message, in accordance with some embodiments of the present disclosure.

FIG. 4 is a diagram of a transaction 465 generated by the transaction application. The transaction 465 may include a public key 415, a blockchain address 430 associated with the first user 110, a digital signature 455, and transaction output information 460. The transaction application may derive a public key 415 from a private key 405 of the first user 110 by applying a cryptographic hash function 410 to the private key 405. The cryptographic hash function 410 may be based on AES, SHA-2, SHA-3, RSA, ECDSA, ECDH (elliptic curve cryptography), or DSA (finite field cryptography), although other cryptographic models may be utilized. More information about cryptographic algorithms may be found in Federal Information Processing Standards Publication (FIPS PUB 180-3), Secure Hash Standard. The transaction application may derive an address or identifier for the first user 110, such as the blockchain address 430, by applying a hash function 420 to the public key 415. Briefly, a hash function is a function that may be used for mapping arbitrary size data to fixed size data. The value may also be referred to as a digest, a hash value, a hash code, or a hash. In order to indicate that the first user 110 is the originator of the transaction 465, the transaction application may generate the digital signature 455 for the transaction data 435 using the private key 405 of the first user 110. The transaction data 435 may include information about the assets to be transferred and a reference to the sources of the assets, such as previous transactions in which the assets were transferred to the first user 110 or an identification of events that originated the assets. Generating the digital signature 455 may include applying a hash function 440 to the transaction data 435 resulting in hashed transaction data 445. The hashed transaction data 445 and the transaction data 435 may be encrypted (via an encryption function 450) using the private key 405 of the first user 110 resulting in the digital signature 455. The transaction output information 460 may include asset information 470 and an address or identifier for the second user, such as the blockchain address 475. The transaction 465 may be sent from the first client device 120 to the server 150.

The specific type of cryptographic algorithm being utilized may vary dynamically based on various factors, such as a length of time, privacy concerns, etc. For example, the type of cryptographic algorithm being utilized may be changed yearly, weekly, daily, etc. The type of algorithms may also change based on varying levels of privacy. For example, an owner of content may implement a higher level of protection or privacy by utilizing a stronger algorithm.

Blockchain Addresses

A blockchain network may utilize blockchain addresses to indicate an entity using the blockchain or start and end points in the transaction. For example, a blockchain address for the first user 110, shown in FIG. 4 as the blockchain address 430 of sender, may include an alphanumeric string of characters derived from the public key 415 of the first user 110 based on applying a cryptographic hash function 420 to the public key 415. The methods used for deriving the addresses may vary and may be specific to the implementation of the blockchain network. In some examples, a blockchain address may be converted into a QR code representation, barcode, token, or other visual representations or graphical depictions to enable the address to be optically scanned by a mobile device, wearables, sensors, cameras, etc. In addition to an address or QR code, there are many ways of identifying individuals, objects, etc. represented in a blockchain. For example, an individual may be identified through biometric information such as a fingerprint, retinal scan, voice, facial id, temperature, heart rate, gestures/movements unique to a person and/or other biometric information that would be apparent to one of skill in the art in possession of the present disclosure, and through other types of identification information such as account numbers, home address, social security number, formal name, and/or other identification information that would be apparent to one of skill in the art in possession of the present disclosure.

Broadcasting Transaction

Figure 5:
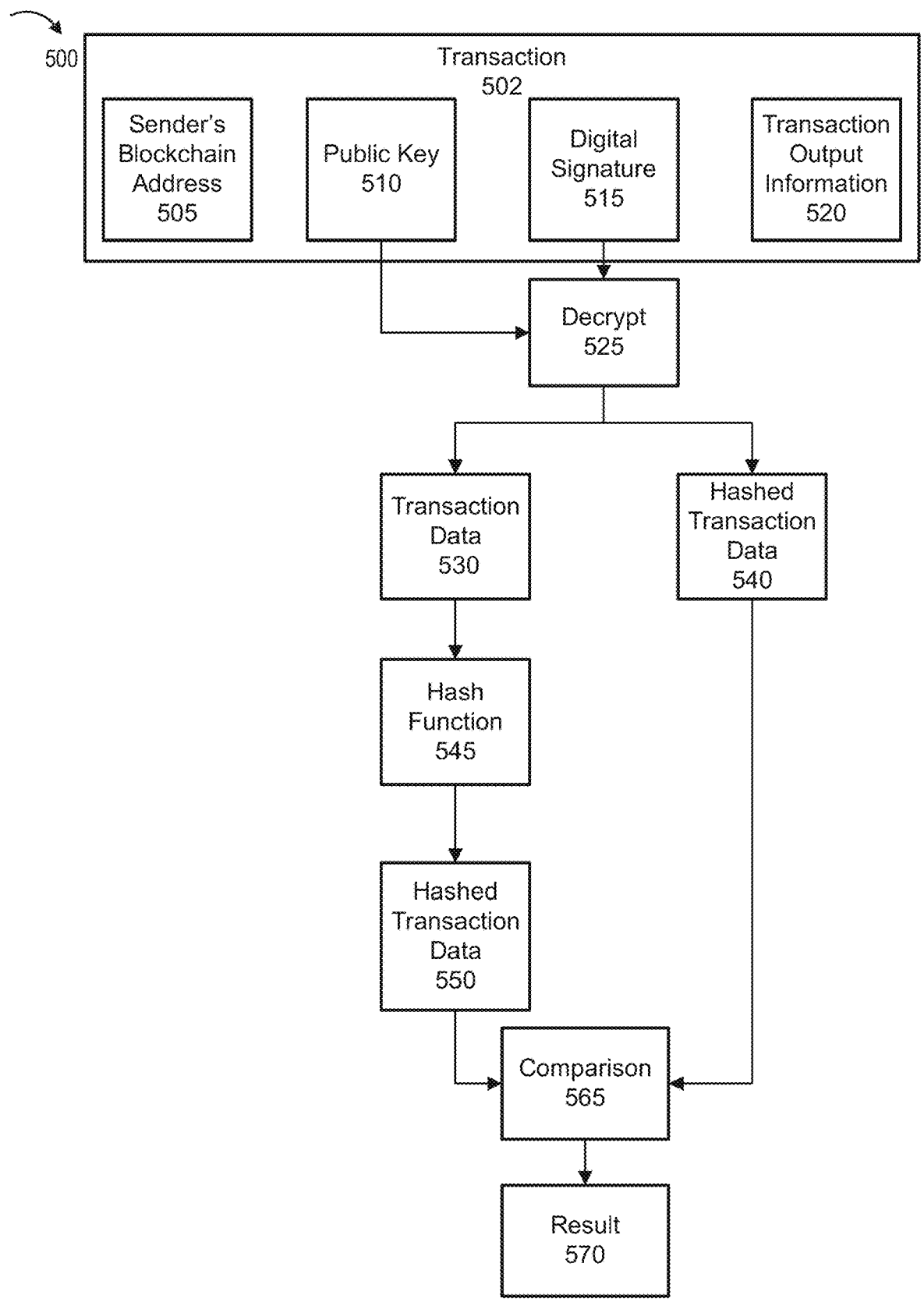
FIG. 5 illustrates an example transaction broadcast on the blockchain network, in accordance with some embodiments of the present disclosure.

The server 150 may receive transactions from users of the blockchain network 130. The transactions may be submitted to the server 150 via desktop applications, smartphone applications, digital wallet applications, web services, or other software applications. The server 150 may send or broadcast the transactions to the blockchain network 130. FIG. 5 shows an example transaction 502 broadcast by the server 150 to the blockchain network 130. The transaction 502 may be broadcast to multiple nodes 205 of the blockchain network 130. Typically, once the transaction 502 is broadcast or submitted to the blockchain network 130, it may be received by one or more of the nodes 205. Once the transaction 502 is received by the one or more nodes 205 of the blockchain network 130, it may be propagated by the receiving nodes 205 to other nodes 205 of the blockchain network 130.

A blockchain network may operate according to a set of rules. The rules may specify conditions under which a node may accept a transaction, a type of transaction that a node may accept, a type of compensation that a node receives for accepting and processing a transaction, and/or other rules that would be apparent to one of skill in the art in possession of the present disclosure. For example, a node may accept a transaction based on a transaction history, reputation, computational resources, relationships with service providers, etc. The rules may specify conditions for broadcasting a transaction to a node. For example, a transaction may be broadcast to one or more specific nodes based on criteria related to the node's geography, history, reputation, market conditions, docket/delay, technology platform. The rules may be dynamically modified or updated (e.g. turned on or off) to address issues such as latency, scalability and security conditions. A transaction may be broadcast to a subset of nodes as a form of compensation to entities associated with those nodes (e.g., through receipt of compensation for adding a block of one or more transactions to a blockchain).

Transaction Validation—User Authentication and Transaction Data Integrity

Not all the full nodes 205 may receive the broadcasted transaction 502 at the same time, due to issues such as latency. Additionally, not all of the full nodes 205 that receive the broadcasted transaction 502 may choose to validate the transaction 502. A node 205 may choose to validate specific transactions, for example, based on transaction fees associated with the transaction 502. The transaction 502 may include a blockchain address 505 for the sender, a public key 510, a digital signature 515, and transaction output information 520. The node 205 may verify whether the transaction 502 is legal or conforms to a pre-defined set of rules. The node 205 may also validate the transaction 502 based on establishing user authenticity and transaction data integrity. User authenticity may be established by determining whether the sender indicated by the transaction 502 is in fact the actual originator of the transaction 502. User authenticity may be proven via cryptography, for example, asymmetric-key cryptography using a pair of keys, such as a public key and a private key. Additional factors may be considered when establishing user authenticity, such as user reputation, market conditions, history, transaction speed, and/or other factors that would be apparent to one of skill in the art in possession of the present disclosure. Data integrity of the transaction 502 may be established by determining whether the data associated with the transaction 502 was modified in any way. Referring back to FIG. 4, when the transaction application creates the transaction 465, it may indicate that the first user 110 is the originator of the transaction 465 by including the digital signature 455.

The node 205 may decrypt the digital signature 515 using the public key 510. A result of the decryption may include hashed transaction data 540 and transaction data 530. The node 205 may generate hashed transaction data 550 based on applying a hash function 545 to the transaction data 530. The node 205 may perform a comparison 565 between the first hashed transaction data 540 and the second hashed transaction data 550. If the result 570 of the comparison 565 indicates a match, then the data integrity of the transaction 502 may be established and node 205 may indicate that the transaction 502 has been successfully validated. Otherwise, the data of the transaction 502 may have been modified in some manner and the node 205 may indicate that the transaction 502 has not been successfully validated.

Each full node 205 may build its own block and add validated transactions to that block. Thus, the blocks of different full nodes 205 may comprise different validated transactions. As an example, a full node 205f may create a first block comprising transactions "A," "B," and "C." Another full node 205b may create a second block comprising transactions "C," "D," and "E." Both blocks may include valid transactions. However, only one block may get added to the blockchain, otherwise the transactions that the blocks may have in common, such as transaction "C" may be recorded twice leading to issues such as double-spending when a transaction is executed twice. One problem that may be seen with the above example is that transactions "C," "D," and "E" may be overly delayed in being added to the blockchain. This may be addressed a number of different ways as discussed below.

Securing Keys

Private keys, public keys, and addresses may be managed and secured using software, such as a digital wallet. Private keys may also be stored and secured using hardware. The digital wallet may also enable the user to conduct transactions and manage the balance. The digital wallet may be stored or maintained online or offline, and in software or hardware or both hardware and software. Without the public/private keys, a user has no way to prove ownership of assets. Additionally, anyone with access a user's public/private keys may access the user's assets. While the assets may be recorded on the blockchain, the user may not be able to access them without the private key.

Establishing User Identity

While a digital signature may provide a link between a transaction and an owner of assets being transferred, it may not provide a link to the real identity of the owner. In some cases, the real identity of the owner of the public key corresponding to the digital signature may need to be established. The real identity of an owner of a public key may be verified, for example, based on biometric data, passwords, personal information, and/or other biometric data that may be apparent to one of skill in the art in possession of the present disclosure. Biometric data may comprise any physically identifying information such as fingerprints, face and eye images, voice sample, DNA, human movement, gestures, gait, expressions, heart rate characteristics, temperature, and/or any other physically identifying information that would be apparent to one of skill in the art in possession of the present disclosure.

Publishing and Validating a Block

As discussed above, full nodes 205 may each build their own blocks that include different transactions. A node may build a block by adding validated transactions to the block until the block reaches a certain size that may be specified by the blockchain rules. However, only one of the blocks may be added to the blockchain. The block to be added to the blockchain and the ordering of the blocks may be determined based on a consensus model. In a proof of work model, both nodes may compete to add their respective block to the blockchain by solving a complex mathematical puzzle. For example, such a puzzle may include determining a nonce, as discussed above, such that a hash (using a predetermined hashing algorithm) of the block to be added to the blockchain (including the nonce) has a value that meets a range limitation. If both nodes solve the puzzle at the same time, then a "fork" may be created. When a full node 205 solves the puzzle, it may publish its block to be validated by the validation nodes 205 of the blockchain network 130.

In a proof of work consensus model, a node validates a transaction, for example, by running a check or search through the current ledger stored in the blockchain. The node will create a new block for the blockchain that will include the data for one or more validated transactions (see, e.g., block data 375 of FIG. 3). In a blockchain implementation such as Bitcoin, the size of a block is constrained. Referring back to FIG. 3, in this example, the block will include a Previous Block Hash 330 representing a hash of what is currently the last block in the blockchain. The block may also include a hash 370 of its own transaction data (e.g., a so-called Merkle hash). According to a particular algorithm, all or selected data from the block may be hashed to create a final hash value. According to an embodiment of the proof of work model, the node will seek to modify the data of the block so that the final hash value is less than a preset value. This is achieved through addition of a data value referred to as a nonce 360. Because final hash values cannot be predicted based on its input, it is not possible to estimate an appropriate value for the nonce 360 that will result in a final hash value that is less than the pre-set value. Accordingly, in this embodiment, a computationally-intensive operation is needed at the node to determine an appropriate nonce value through a "brute force" trial-and-error method.

Once a successful nonce value is determined, the completed block is published to the blockchain network for validation. If validated by a majority of the nodes in the block chain network, the completed block is added to the blockchain at each participating node. When a node's block is not added to the blockchain, the block is discarded and the node proceeds to build a new block. The transactions that were in the discarded block may be returned to a queue and wait to be added to a next block. When a transaction is discarded or returned to the queue, the assets associated with the discarded transaction are not lost, since a record of the assets will exist in the blockchain. However, when a transaction is returned to the queue the return causes a delay in completing the transaction. Reducing the time to complete a transaction may be important. A set of blockchain rules, or renumeration/compensation for a node to process the returned transaction may determine how a returned transaction is to be treated going forward. When a transaction is put into a pool then it can have a priority level but then a rule may indicate that the transaction priority level must exceed a threshold level. The priority level of a returned or discarded transaction may be increased. Another way to reduce the time to complete a transaction is to have the system, service provider, participant in the transaction, or merchant pay additional incentive for nodes to process a returned transaction. As an example, a service provider may identify a network of preferred miners based on geography or based on a volume discount perspective. The time to complete a transaction may be optimized by routing a returned transaction to specific preferred nodes. A transaction may be associated with an address that limits which of the preferred nodes will get to process the transaction if it is returned due to its inclusion in a discarded block. A value may be associated with the transaction so that it goes to preferred miners in a specific geographic location. Additionally, returned transactions may be processed based on pre-set rules. For example, a rule may indicate a commitment to process a specific number of returned transactions to receive additional incentive or compensation.

Blockchain Confirmations

After a block comprising a transaction is added to a blockchain, a blockchain confirmation may be generated for the transaction. The blockchain confirmation may be a number of blocks added to the blockchain after the block that includes the transaction. For example, when a transaction is broadcast to the blockchain, there will be no blockchain confirmations associated with the transaction. If the transaction is not validated, then the block comprising the transaction will not be added to the blockchain and the transaction will continue to have no blockchain confirmations associated with it. However, if a block comprising the transaction is validated, then each of the transactions in the block will have a blockchain confirmation associated with the transaction. Thus, a transaction in a block will have one blockchain confirmation associated with it when the block is validated. When the block is added to the blockchain, each of the transactions in the block will have two blockchain confirmations associated with it. As additional validated blocks are added to the blockchain, the number of blockchain confirmations associated with the block will increase. Thus, the number of blockchain confirmations associated with a transaction may indicate a difficulty of overwriting or reversing the transaction. A higher valued transaction may require a larger number of blockchain confirmations before the transaction is executed.

Consensus Models

As discussed above, a blockchain network may determine which of the full nodes 205 publishes a next block to the blockchain. In a permissionless blockchain network, the nodes 205 may compete to determine which one publishes the next block. A node 205 may be selected to publish its block as the next block in the blockchain based on consensus model. For example, the selected or winning node 205 may receive a reward, such as a transaction fee, for publishing its block, for example. Various consensus models may be used, for example, a proof of work model, a proof of stake model, a delegated proof of stake model, a round robin model, proof of authority or proof of identity model, and proof of elapsed time model.

In a proof of work model, a node may publish the next block by being the first to solve a computationally intensive mathematical problem (e.g., the mathematical puzzle described above). The solution serves as "proof" that the node expended an appropriate amount of effort in order to publish the block. The solution may be validated by the full nodes before the block is accepted. The proof of work model, however, may be vulnerable to a 51% attack. The proof of stake model is generally less computationally intensive that the proof of work model. Unlike the proof of work model which is open to any node having the computational resources for solving the mathematical problem, the proof of stake model is open to any node that has a stake in the system. The stake may be an amount of cryptocurrency that the blockchain network node (user) may have invested into the system. The likelihood of a node publishing the next block may be proportional to its stake. Since this model utilizes fewer resources, the blockchain may forego a reward as incentive for publishing the next block. The round robin model is generally used by permissioned blockchain networks. Using this model, nodes may take turns to publish new blocks. In the proof of elapsed time model, each publishing node requests a wait time from a secure hardware within their computer system. The publishing node may become idle for the duration of the wait time and then creates and publishes a block to the blockchain network. As an example, in cases where there is a need for speed and/or scalability (e.g. in the context of a corporate environment), a hybrid blockchain network may switch to be between completely or partially permissioned and permissionless. The network may switch based on various factors, such as latency, security, market conditions, and/or other factors.

Blockchain Based Application: Cryptocurrency

Cryptocurrency is a medium of exchange that may be created and stored electronically in a blockchain, such as a the blockchain 130a in FIG. 1. Bitcoin is one example of cryptocurrency, however there are many other cryptocurrencies. Various encryption techniques may be used for creating the units of cryptocurrency and verifying transactions. As an example, the first user 110 may own 10 units of a cryptocurrency. The blockchain 130a may include a record indicating that the first user 110 owns the 10 units of cryptocurrency. The first user 110 may initiate a transfer of the 10 units of cryptocurrency to the second user 115 via a wallet application executing on the first client device 120. The wallet application may store and manage a private key of the first user 110. Examples of the wallet device include a personal computer, a laptop computer, a smartphone, a personal data assistant (PDA), and/or other computing devices that would be apparent to one of skill in the art in possession of the present disclosure.

Figure 6A:
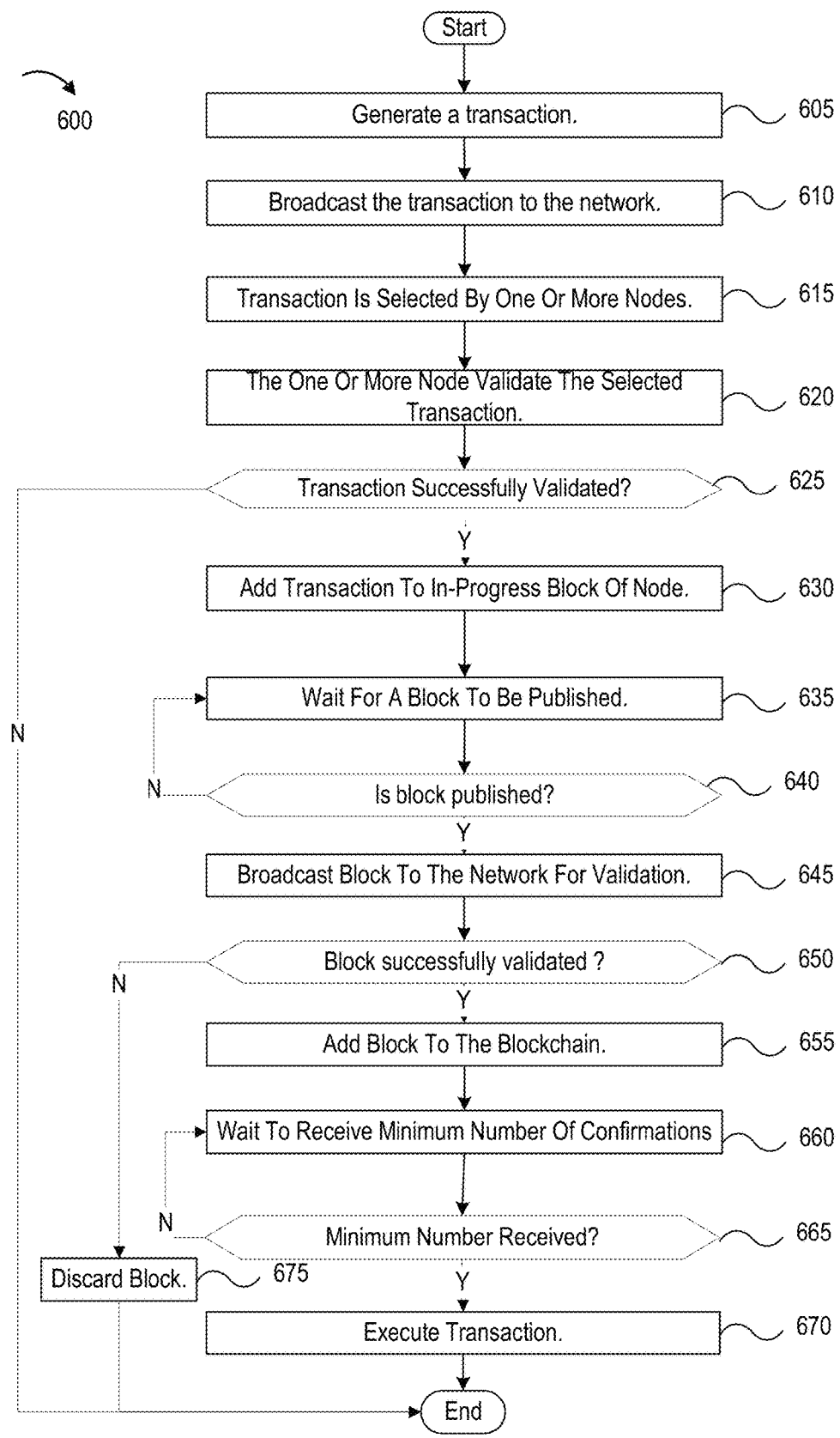
FIG. 6A illustrates a flow diagram showing steps of an example method for performing a blockchain based transaction, in accordance with some embodiments of the present disclosure.

FIG. 6A is a flow diagram showing steps of an example method 600 for performing a blockchain transaction between entities, such as the first user 110 of the first client device 120 and the second user 115 of the second client device 125 in FIG. 1. The steps of the method 600 may be performed by any of the computing devices shown in FIG. 1. Alternatively or additionally, some or all of the steps of the method 600 may be performed by one or more other computing devices. Steps of the method 600 may be modified, omitted, and/or performed in other orders, and/or other steps added.

At step 605, the wallet application may generate transaction data for transferring the 10 units of cryptocurrency from the first user 110 to the second user 115. The wallet application may generate a public key for the transaction using the private key of the first user 110. In order to indicate that the first user 110 is the originator of the transaction, a digital signature may also be generated for the transaction using the private key of the first user 110. As discussed with reference to FIG. 4, the transaction data may include information, such as a blockchain address 430 of the sender, the digital signature 455, transaction output information 460, and the public key 415 of the sender. The transaction data may be sent to the server 150 from the first client device 120.

The server 150 may receive the transaction data from the first client device 120. At step 610, the server 150 may broadcast the transaction to the blockchain network 130a. The transaction may be received by one or more nodes 205 of the blockchain network 130a. At step 615, upon receiving the transaction, a node 205 may choose to validate the transaction, for example, based on transaction fees associated with the transaction. If the transaction is not selected for validation by any of the nodes 205, then the transaction may be placed in a queue and wait to be selected by a node 205.

At step 620, each of the nodes 205 that selected the transaction may validate the transaction. Validating the transaction may include determining whether the transaction is legal or conforms to a pre-defined set of rules for that transaction, establishing user authenticity, and establishing transaction data integrity. At step 625, if the transaction is successfully validated by a node 205, the validated transaction is added to a block being constructed by that node 205. As discussed above, since different nodes 205 may choose to validate different transactions, different nodes 205 may build or assemble a block comprising different validated transactions. Thus, the transaction associated with the first user 110 transferring 10 units of cryptocurrency to the second user 115 may be included in some blocks and not others.

At step 635, the blockchain network 130a may wait for a block to be published. Validated transactions may be added to the block being assembled by a node 205 until it reaches a minimum size specified by the blockchain. If the blockchain network 130a utilizes a proof of work consensus model, then the nodes 205 may compete for the right to add their respective blocks to the blockchain by solving a complex mathematical puzzle. The node 205 that solves its puzzle first wins the right to publish its block. As compensation, the winning node may be awarded a transaction fee associated with the transaction (e.g., from the wallet of the first user 110). Alternatively, or in addition, the winning node may be awarded compensation as an amount of cryptocurrency added to an account associated with the winning node from the blockchain network (e.g., "new" units of cryptocurrency entering circulation). This latter method of compensation and releasing new units of cryptocurrency into circulation is sometimes referred to as "mining." At step 640, if a block has not been published, then the method 600 returns to step 635 and waits for a block to be published.

However, at step 640, if a block has been published, then the method 600 proceeds to step 645.

At step 645, the published block is broadcast to the blockchain network 130a for validation. At step 650, if the block is validated by a majority of the nodes 205, then at step 655, the validated block is added to the blockchain 220. However, at step 650, if the block is not validated by a majority of the nodes 205, then the method 600 proceeds to step 675. At step 675, the block is discarded and the transactions in the discarded block are returned back to the queue. The transactions in the queue may be selected by one or more nodes 205 for the next block. The node 205 that built the discarded block may build a new next block.

At step 660, if the transaction was added to the blockchain 220, the server 150 may wait to receive a minimum number of blockchain confirmations for the transaction. At step 665, if the minimum number of confirmations for the transaction have not been received, then the process may return to step 660. However, if at step 665, the minimum number of confirmations have been received, then the process proceeds to step 670. At step 670, the transaction may be executed and assets from the first user 110 may be transferred to the second user 115. For example, the 10 units of cryptocurrency owned by the first user 110 may be transferred from a financial account of the first user 110 to a financial account of the second user 115 after the transaction receives at least three confirmations.

Smart Contracts

A smart contract as discussed herein is an agreement that is stored in a blockchain and automatically executed when the agreement's predetermined terms and conditions are met. The terms and conditions of the agreement may be visible to other users of the blockchain. When the predefined rules are satisfied, then the relevant code is automatically executed. The agreement may be written as a script using a programming language such as Java, C++, JavaScript, VBScript, PHP, Perl, Python, Ruby, ASP, Tcl, etc. The script may be uploaded to the blockchain as a transaction on the blockchain.

As an example, the first user 110 (also referred to as tenant 110) may rent an apartment from the second user 115 (also referred to as landlord 115). A smart contract may be utilized between the tenant 110 and the landlord 115 for payment of the rent. The smart contract may indicate that the tenant 110 agrees to pay next month's rent of $1000 by the $28^{th}$ of the current month. The agreement may also indicate that if the tenant 110 pays the rent, then the landlord 115 provides the tenant 110 with an electronic receipt and a digital entry key to the apartment. The agreement may also indicate that if the tenant 110 pays the rent by the $28^{th}$ of the current month, then on the last day of the current month, both the entry key and the rent are released respectively to the tenant 110 and the landlord 115.

Figure 6B:
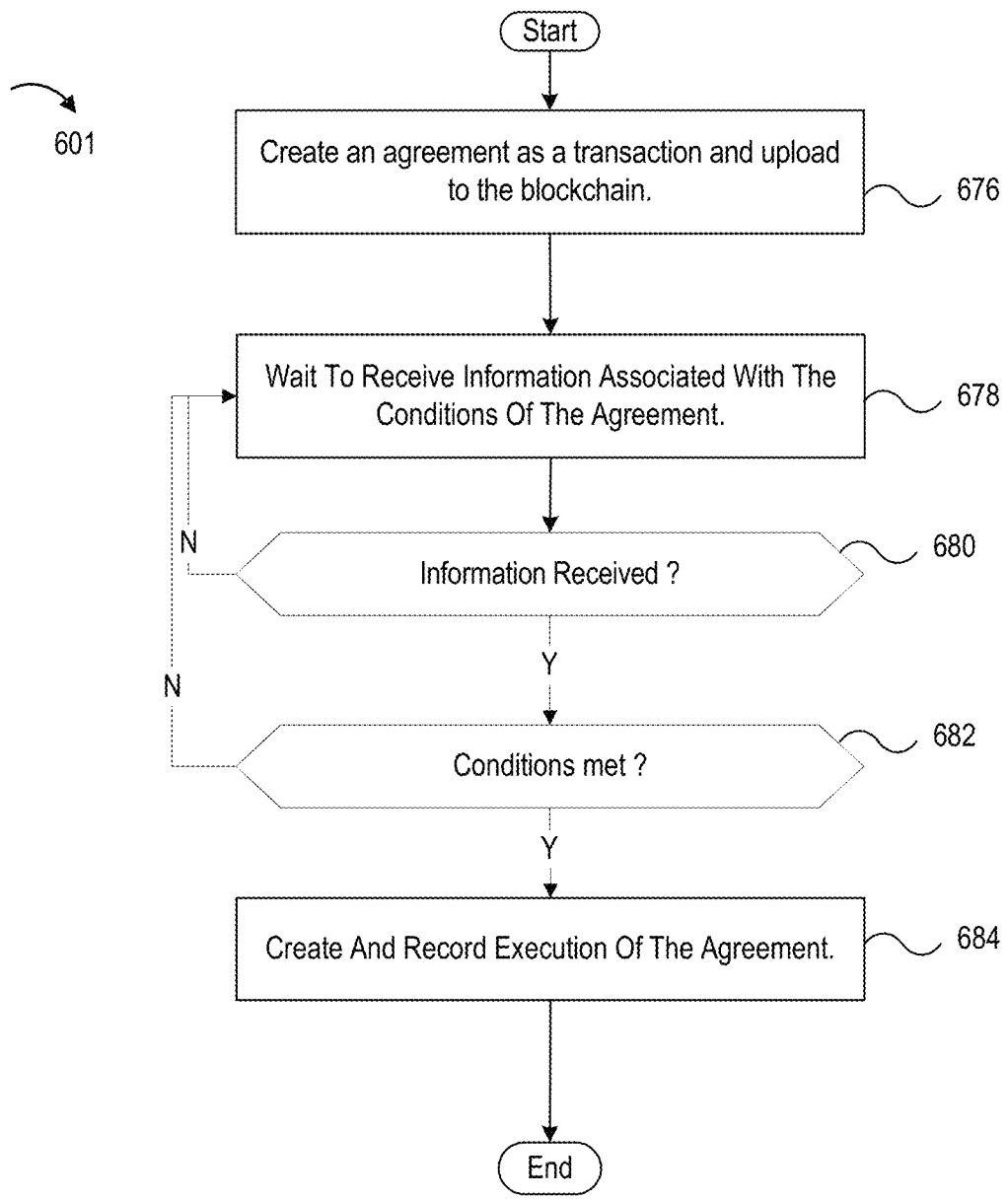
FIG. 6B illustrates a flow diagram showing steps of an example method for performing a blockchain based transaction using a smart contract, in accordance with some embodiments of the present disclosure.

FIG. 6B is a flow diagram showing steps of an example method 601 for performing a smart contract transaction between entities, such as the tenant 110 and the landlord 115. Other examples of using a smart contract between the user 110 and the user 115 are discussed further below with respect to the present disclosure. The steps of the method 601 may be performed by any of the computing devices shown in FIG. 1. Alternatively or additionally, some or all of the steps of the method 601 may be performed by one or more other computing devices. Steps of the method 601 may be modified, omitted, and/or performed in other orders, and/or other steps added.

At step 676, the agreement or smart contract between the tenant 110 and the landlord 115 may be created and then submitted to the blockchain network 130a as a transaction. The transaction may be added to a block that is mined by the nodes 205 of the blockchain network 130a, the block comprising the transaction may be validated by the blockchain network 130a and then recorded in the blockchain 220 (as shown in steps 610-655 in FIG. 6A). The agreement associated with the transaction may be given a unique address for identification.

At step 678, the method 601 waits to receive information regarding the conditions relevant for the agreement. For example, the method 601 may wait to receive notification that $1000 was sent from a blockchain address associated with the tenant 110 and was received at a blockchain address associated with the landlord 115 by the $28^{th}$ of the current month. At step 680, if such a notification is not received, then the method 601 returns to step 678. However, if at step 680, a notification is received, then the method 601 proceeds to step 682.

At step 682, based on determining that the received notification satisfies the conditions needed to trigger execution of the various terms of the smart contract, the method 601 proceeds to step 684. However, at step 682, if it is determined that the received notification does not satisfy the conditions needed to trigger execution of the smart contract, then the method 601 returns to step 678. At step 683, the method 601 creates a transaction associated with execution of the smart contract. For example, the transaction may include information of the payment received, the date the payment was received, an identification of the tenant 110 and an identification of the landlord 115. The transaction may be broadcast to the blockchain network 130a and recorded in the blockchain 220 (as shown in steps 610-655 of the method 600 of FIG. 6A). If the transaction is successfully recorded in the blockchain 220, the transaction may be executed. For example, if the payment was received on the $28^{th}$, then an electronic receipt may be generated and sent to the tenant 110. However, on the last day of the current month, both the digital entry key and the rent are released respectively to the tenant 110 and the landlord 115.

Smart contracts may execute based on data received from entities that are not on the blockchain or off-chain resources. For example, a smart contract may be programmed to execute if a temperature reading from a smart sensor or IoT sensor falls below 10 degrees. Smart contracts are unable to pull data from off-chain resources. Instead, such data needs to be pushed to the smart contract. Additionally, even slight variations in data may be problematic since the smart contract is replicated across multiple nodes of the network. For example, a first node may receive a temperature reading of 9.8 degrees and a second node may receive a temperature reading of 10 degrees. Since validation of a transaction is based on consensus across nodes, even small variations in the received data may result in a condition of the smart contract to be evaluated as being not satisfied. Third party services may be utilized to retrieve off-chain resource information and push this to the blockchain. These third party services may be referred to as oracles. Oracles may be software applications, such as a big data application, or hardware, such as an IoT or smart device. For example, an oracle service may evaluate received temperature readings beforehand to determine if the readings are below 10 degrees and then push this information to the smart contract. However, utilizing oracles may introduce another possible point of failure into the overall process. Oracles may experience errors, push incorrect information or may even go out of business.

Since blockchains are immutable, amending or updating a smart contract that resides in a blockchain may be challenging and thus, more expensive and/or more restrictive than with text-based contracts.

Internet of Things (IoT)

An IoT network may include devices and sensors that collect data and relay the data to each other via a gateway. The gateway may translate between the different protocols of the devices and sensors as well as manage and process the data. IoT devices may, for example, collect information from their environments such as motions, gestures, sounds, voices, biometric data, temperature, air quality, moisture, light, and/or any other environmental information that would be apparent to one of skill in the art in possession of the present disclosure. The collected information sent over the Internet for further processing. Typically, IoT devices use a low power network, Bluetooth, Wi-Fi, or satellite to connect to the Internet or "the cloud". Some IoT related issues that blockchain may be able to detect include a lack of compliance in the manufacturing stage of an IoT device. For example, a blockchain may track whether an IoT device was adequately tested.

As discussed above, information from off-chain resources, including IoT devices, may be pushed to smart contracts via third party entities known as oracles. As an example, a smart refrigerator may monitor the use of an item stored in the refrigerator, such as milk. Various sensors within the refrigerator may be utilized for periodically determining an amount of milk stored in the refrigerator. A smart contract stored in a blockchain may indicate that if the weight of the stored milk falls below 10 ounces, then a new carton of milk is automatically purchased and delivered. The refrigerator sensors may periodically send their readings to a third-party service or oracle. The oracle may evaluate the sensor readings to determine whether the conditions for purchasing a new carton of milk have been met. Upon determining that the weight of the stored milk is below 10 ounces, the oracle may push information to the smart contract indicating that the condition for executing the smart contract has been met. The smart contract may be executed, and a new carton of milk may be automatically purchased. Both the execution of the smart contract and the purchase of the new carton may be recorded in the blockchain. In some cases, the condition may be an occurrence of an event, such as a need or anticipated need, or convenience factors, such as a delivery day, cost, promotions, or incentives.

Some issues related to the integration of blockchain into IoT include speed of transactions and computational complexity. The speed at which transactions are executed on the blockchain may be important when IoT networks with hundreds or thousands of connected devices are all functioning and transacting simultaneously. IoT devices are generally designed for connectivity rather than computation and therefore, may not have the processing power to support a blockchain consensus algorithm, such as proof of work. IoT devices also tend to be vulnerable to hacking via the Internet and/or physical tampering. For example, IoT devices may be more vulnerable to DDoS and malware attacks. Hackers may target a specific network and begin spamming the network with traffic within a short amount of time. Because of the increased surge in traffic, the bandwidth may be quickly overloaded, and the entire system may crash.

Figure 7:
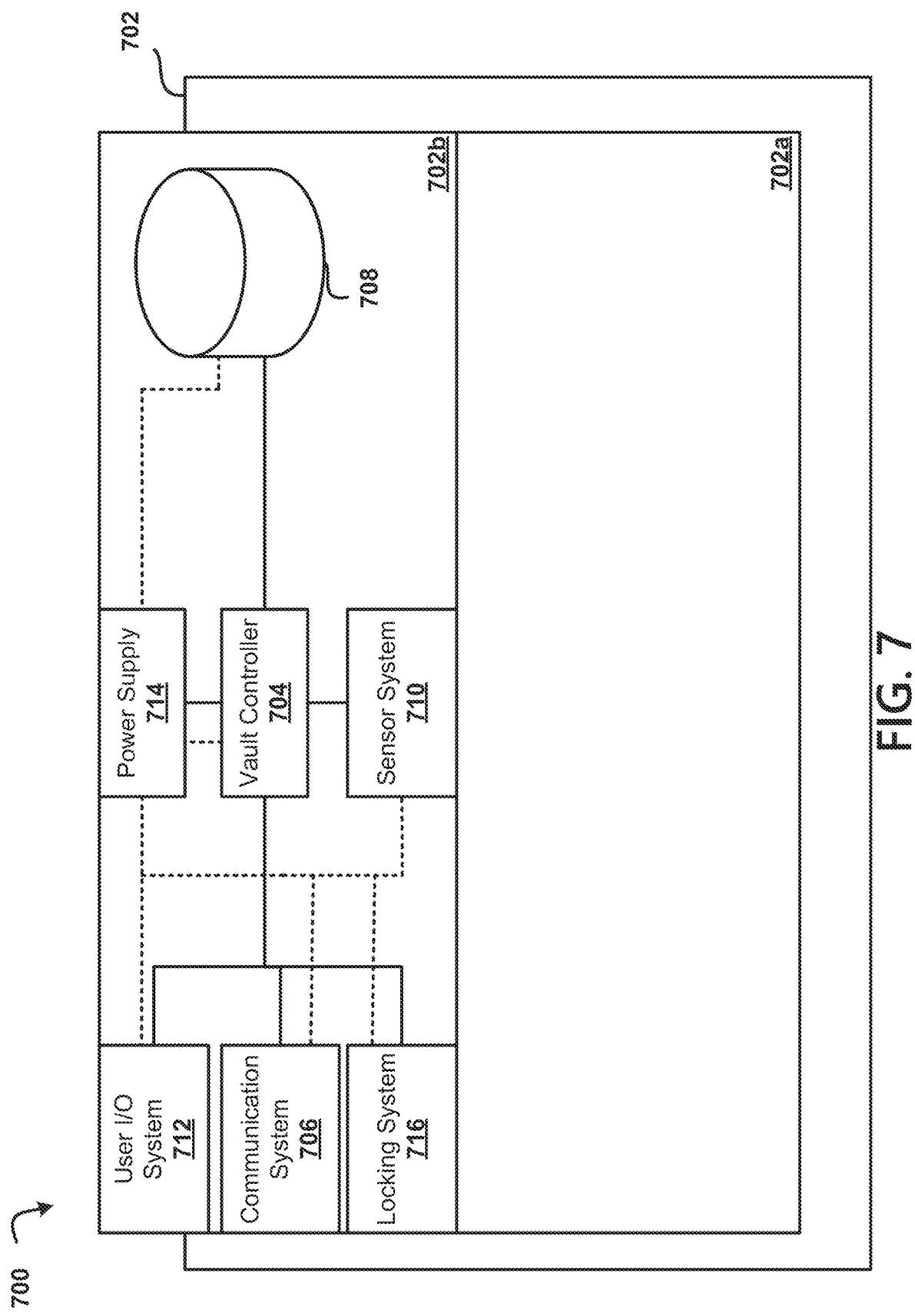
FIG. 7 is a block diagram of an Internet of Things (IoT) device included in the computing architecture of FIG. 1, in accordance with some embodiments of the present disclosure.

Referring now to FIG. 7, an embodiment of a vault device 700 is illustrated that may be included in the IoT device 155 discussed above with reference to FIG. 1. In the illustrated embodiment, the vault device 700 includes a chassis 702 that houses the components of the vault device 700. The chassis 702 may include a container device such as, for example, a box, a crate, a vault, a drum, a bottle, a shipping container, and/or any other container device that would be apparent to one of skill in the art in possession of the present disclosure. As such, the chassis 702 may define a volume 702a that is used to contain or otherwise hold an object such as any solid, liquid, and/or gas. In addition, the chassis may include a closure 702b that prevents the movement of the object between the volume 702a and an external volume via an aperture defined by the chassis 702 when the closure 702b is in a closed orientation. The closure 702b may permits movement of the object between the volume 702a and an external volume through the aperture when the closure 702b is in an open orientation. The closure 702b may include a lid, a covering, a stopper, a cap, a door, and/or any other closure that would be apparent to one of skill in the art in possession of the present disclosure.

In various examples, the chassis 702 may house a processing system (not illustrated) and a non-transitory memory system (not illustrated) that includes instructions that, when executed by the processing system, cause the processing system to provide a vault controller 704 that is configured to perform the functions of the vault devices or vault controllers discussed below. The chassis 702 may further house a communication system 706 that is coupled to the vault controller 704 (e.g., via a coupling between the communication system 706 and the processing system). The communication system 706 may include software or instructions that are stored on a computer-readable medium and that allow the vault device 700 to send and receive information through the communication networks discussed above. For example, the communication system 706 may include a first communication interface to provide for communications through the network 140 of FIG. 1 as detailed above (e.g., first (e.g., long-range) transceiver(s)). In an embodiment, the first communication interface may be a wireless antenna that is configured to provide communications with IEEE 802.11 protocols (Wi-Fi), cellular communications, satellite communications, other microwave radio communications and/or communications. The communication system 706 may also include a second communication interface that is configured to provide direct communication with client devices 120 and/or 125, other IoT devices 155, and/or any other devices included in the physio-digital non-fungible token system 100 discussed above with respect to FIG. 1 (e.g., second (e.g., short-range) transceiver(s)). For example, the second communication interface may be configured to operate according to wireless protocols such as Bluetooth®, Bluetooth® Low Energy (BLE), near field communication (NFC), infrared data association (IrDA), ANT®, Zigbee®, Z-Wave® IEEE 802.11 protocols (Wi-Fi), and other wireless communication protocols that allow for direct communication between devices.

The chassis 702 may also house a storage system 708 that is coupled to the vault controller 704 through the processing system. The storage system 708 may store sensor data, user authentication profiles, instructions, conditions, and/or any other information or instructions that would be apparent to one of skill in the art in possession of the present disclosure.

In various embodiments, the vault device 700 may include a sensor system 710 that may be housed in the chassis 702 and/or provided on the chassis 702. The sensor system 710 may be coupled to the vault controller 704 via the processing system. The sensor system 710 may include one or more sensors that gather sensor data about the vault device 700, a user (e.g., user 110 or user of the vault device 700, an environment around the vault device 700 and/or other sensor data that may be apparent to one of skill in the art in possession of the present disclosure. In various embodiments, the sensor system 710 may include an accelerometer, a gyroscope, a positioning system (e.g., GPS), a heart rate monitor, a fingerprint scanner, other biometric sensors, an actuator, a pressure sensor, a temperature sensor, an imaging sensor (e.g., a camera), an RFID reader/writer and/or any other sensor that would be apparent to one of skill in the art in possession of the present disclosure.

The chassis 702 may also house a user input/output (I/O) system 712. The user I/O system 712 may be coupled to the vault controller 704 via the processing system. The user I/O system 712 may provide one or more input devices such as, for example, keyboards, a keypad, touchscreens, pointing devices such as mouses, trackballs, and trackpads, a voice control system, a display system that includes a display, and/or a variety of other input devices for a user to provide inputs to the vault device 700 that would be apparent to one of skill in the art in possession of the present disclosure. The user I/O system 712 may include one or more output devices such as a haptic feedback device that is configured to provide sounds, vibrations, visualizations, and/or other tactile and/or haptic feedback known in the art.

The chassis 702 may also house a power supply system 714 that may include and/or be configured to couple to a battery. For example, the power supply system 714 may include an integrated rechargeable battery that may be recharged in the chassis 702, and/or may include other power sources that would be apparent to one of skill in the art in possession of the present disclosure. In some embodiments, the rechargeable battery may be charged by a solar cell, a piezoelectric transducer, a kinetic energy charger, and/or any other wireless charging device included in the power supply system 714 such that the vault device 700 does not require being plugged in during transport. In some embodiments, a user device such as the client devices 120 and/or 125 may be configured to couple to the chassis 702 (e.g., via a port system that includes a power port) that may provide for the recharging of a rechargeable battery included in the power supply system 714. In various embodiments, port systems may include a data port configured to communicate data between the vault controller 704 and the user device (e.g., via a cable or other connector.) In other embodiments, the power supply system 714 may be configured to accept a replaceable, non-rechargeable battery while remaining within the scope of the present disclosure as well. While vault device 700 has been illustrated and described, one of skill in the art in possession of the present disclosure will recognize that the teachings of the present disclosure will be beneficial for a variety of visual indicator systems that would be apparent to one of skill in the art in possession of the present disclosure and, as such, a wide variety of modifications to the number, types, and orientation of devices and modules in the vault device 700 will fall within the scope of the present disclosure as well.

The chassis 702 may also house a locking system 716. The locking system 716 may be coupled to the vault controller 704 via the processing system. The locking system 716 may include a lock such that an engagement member of the lock, included in either the closure 702b or the chassis 702, may engage an aperture included in the chassis 702 or the closure 702b, respectively. The locking system 716 may prevent movement of the closure 702b from the closed orientation to the open orientation. The locking system 716 may require a "key" to unlock the locking system 716 such that the closure 702b can move from the closed orientation to an open orientation. The key may include a physical key, a biometric key, a code, and/or any other mechanism for "unlocking" and/or "locking" the locking system 716. While the various components of the vault device 700 are illustrated as being housed in the closure 702*b*, one of skill in the art in possession of the present disclosure that some or all of the components (e.g., 704-716) may be housed in the volume 702*a*, the closure 702*b*, in the chassis 702, and/or external the chassis 702 and still fall under the scope of the present disclosure.

Figure 8:
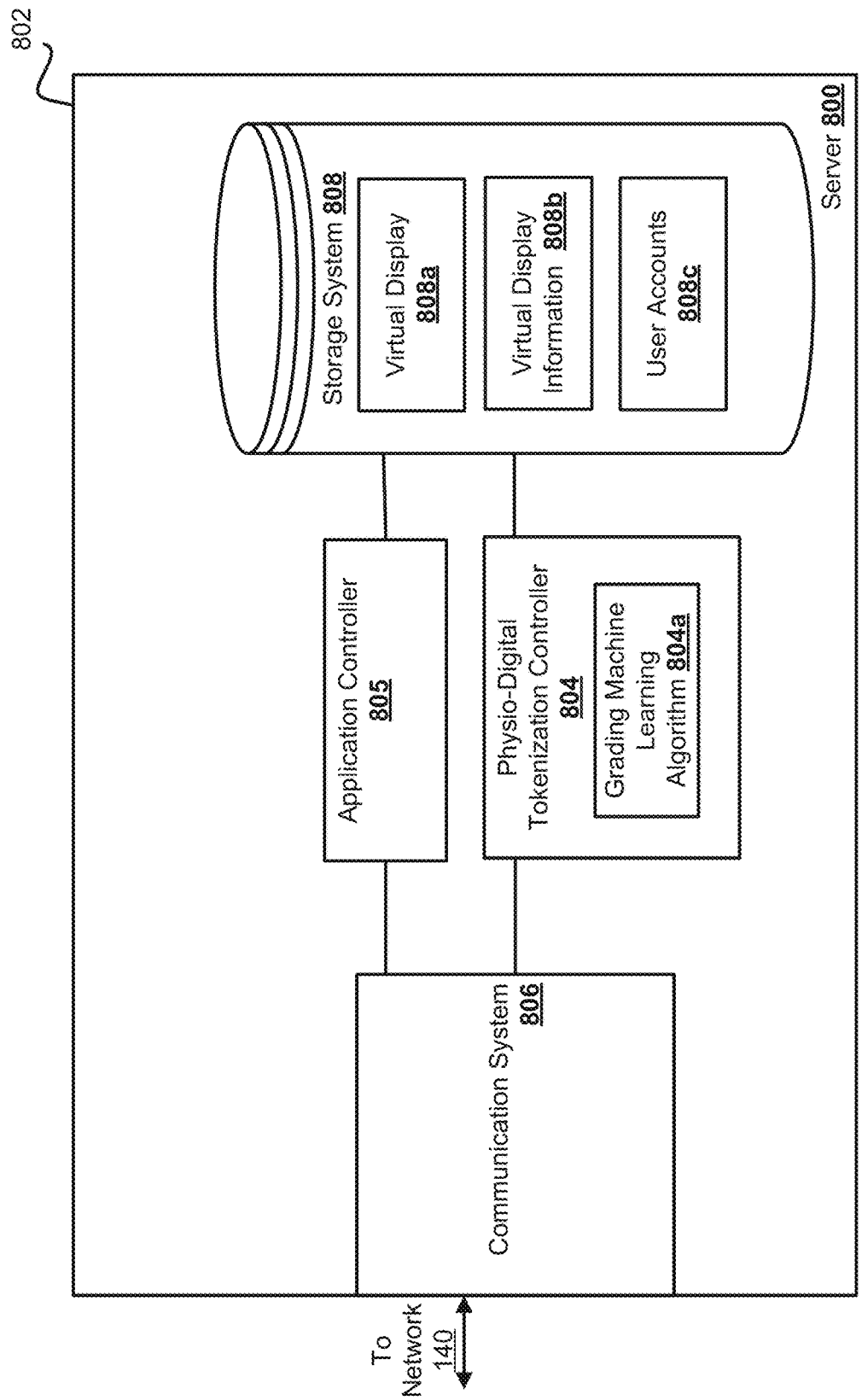
FIG. 8 is a block diagram of a server computing device included in the computing architecture of FIG. 1, in accordance with some embodiments of the present disclosure.

Referring now to FIG. 8, an embodiment of a server 800 is illustrated that may be the server 150 or 152 discussed above with reference to FIG. 1. In the illustrated embodiment, the server 800 includes a chassis 802 that houses the components of the server 800, only some of which are illustrated in FIG. 8. For example, the chassis 802 may house a processing system (not illustrated) and a non-transitory memory system (not illustrated) that includes instructions that, when executed by the processing system, cause the processing system to provide a physio-digital tokenization controller 804 that is configured to perform the functions of the physio-digital tokenization controller, physio-digital tokenization provider computing devices, and/or servers discussed below. In the specific example illustrated in FIG. 8, the physio-digital tokenization controller 804 is configured to computationally process a virtual display 808*a* of a physical object from images taken of the physical object by an image-capturing device (e.g., a scanner, a microscope, a camera, and/or other image-capturing devices discussed herein). The physio-digital tokenization controller 804 may also tokenize the image. In some embodiments, the physio-digital tokenization controller 804 may include a grading machine learning algorithm 804*a* used to grade the physical object using the virtual display 808*a* and/or the images used to generate the virtual display 808*a*. In various embodiments, the server 800 or another server that is associated with physio-digital tokenization provider may include an application controller 805. The application controller 805 is configured to perform the functions of the application controller, physio-digital tokenization provider computing devices, and/or servers discussed below. The application controller may provide one or more applications that use the physio-digital token, the virtual display 808*a* and/or virtual display information 808*b* (also referred to herein as object content) to run an application. For example, the application controller 805 may include a gaming application that uses virtual displays and/or the virtual display information in game play. In other embodiments, the application controller may include a user experience application that incorporates the virtual display 808*a* and/or virtual display information 808*b* into a user experience.

The chassis 802 may further house a communication system 806 that is coupled to the physio-digital tokenization controller 804 and the application controller 805 (e.g., via a coupling between the communication system 806 and the processing system) and that is configured to provide for communication through the network 130*c* and/or the network 140 of FIG. 1 as detailed below. The communication system 806 may allow the server 800 to send and receive information over the network 140 of FIG. 1. The chassis 802 may also house a storage device (not illustrated) that provides a storage system 808 that is coupled to the physio-digital tokenization controller 804 through the processing system. The storage system 808 may be configured to store virtual displays 808*a*, virtual display information 808*b*, and user accounts 808*c*. In various embodiments, the storage system 808 may be provided on the server computing device 800 and/or on a database accessible via the communication system 806 and may include other data and/or instructions that would be apparent to one of skill in the art in possession.

Tokens

A token may refer to an entry in the blockchain that belongs to a blockchain address. The entry may comprise information indicating ownership of an asset. The token may represent money, a contract, property, records, access rights, status, supply, demand, alarm, trigger, reputation, a ticket, or any other asset that may be represented in digital form. For example, a token may refer to an entry related to cryptocurrency that is used for a specific purpose or may represent ownership of a real-world asset, such as Fiat currency, real-estate, sports memorabilia, physical artwork, comic books, and/or any other physical object that would be apparent to one of skill in the art in possession of the present disclosure. Token contracts refer to cryptographic tokens that represent a set of rules that are encoded in a smart contract. The person that owns the private key corresponding to the blockchain address may access the token(s) at the address. Thus, the blockchain address may represent an identity of the person that owns the token(s). Only the owner of the blockchain address may send the token to another person. The tokens may be accessible to the owner via the owner's wallet (e.g., included in the user accounts 808*c* of server 800 of FIG. 8). The owner of a token may send or transfer the token to a user via a blockchain transaction. For example, the owner may sign the transaction corresponding to the transfer of the token with the private key. When the token is received by the user, the token may be recorded in the blockchain at the blockchain address of the user.

A token may implement a token standard. For example, a token may be implemented according to the ERC-20 standard, the ERC-721 standard, the ERC-994 standard, the ERC-998 standard, the ERC-1155 standard, and/or any other token standard configured for the Ethereum blockchain network or other blockchain network that includes a virtual machine for executing contract bytecode on its blockchain as would be apparent to one of skill in the art in possession of the present disclosure. Each token standard may have different requirements of features that a token must have to be considered a token that implements that standard and that can be used by smart contracts or applications that also are generated according to the token standard. For example, a token that implements the ERC-20 standard is a fungible token and must have six mandatory rules of: totalSupply, balanceOf, transfer, transferFrom, approve, and allowance. In other examples, a token that implements the ERC-721 standard is a non-fungible token. As would be apparent to one of skill in the art in possession of the present disclosure, a fungible token is a token that is indistinguishable from another token of the same type while a non-fungible token would be a unique token that can be distinguished from another token. A token that implements the ERC-994 standard and the ERC-994 standard may be a non-fungible token and may be hierarchical with other tokens that implement the ERC-994 standard. In other words, the tokens may form a tree-like structure of parent/child non-fungible tokens. In yet other examples, tokens that implement the ERC-1155 standard may be minted from a single smart contract, rather than a smart contract for each token as is required in many of the other standards. As such, the smart contract that implements the ERC-1155 standard has the ability to generate both non-fungible and fungible tokens. While specific token standards are discussed, other token standards for other blockchains may be contemplated. For example, a token standard on the EOS blockchain may be contemplated. Also, a standard that may be used to store a non-fungible token across more than one blockchain may also be contemplated.

Figure 9:
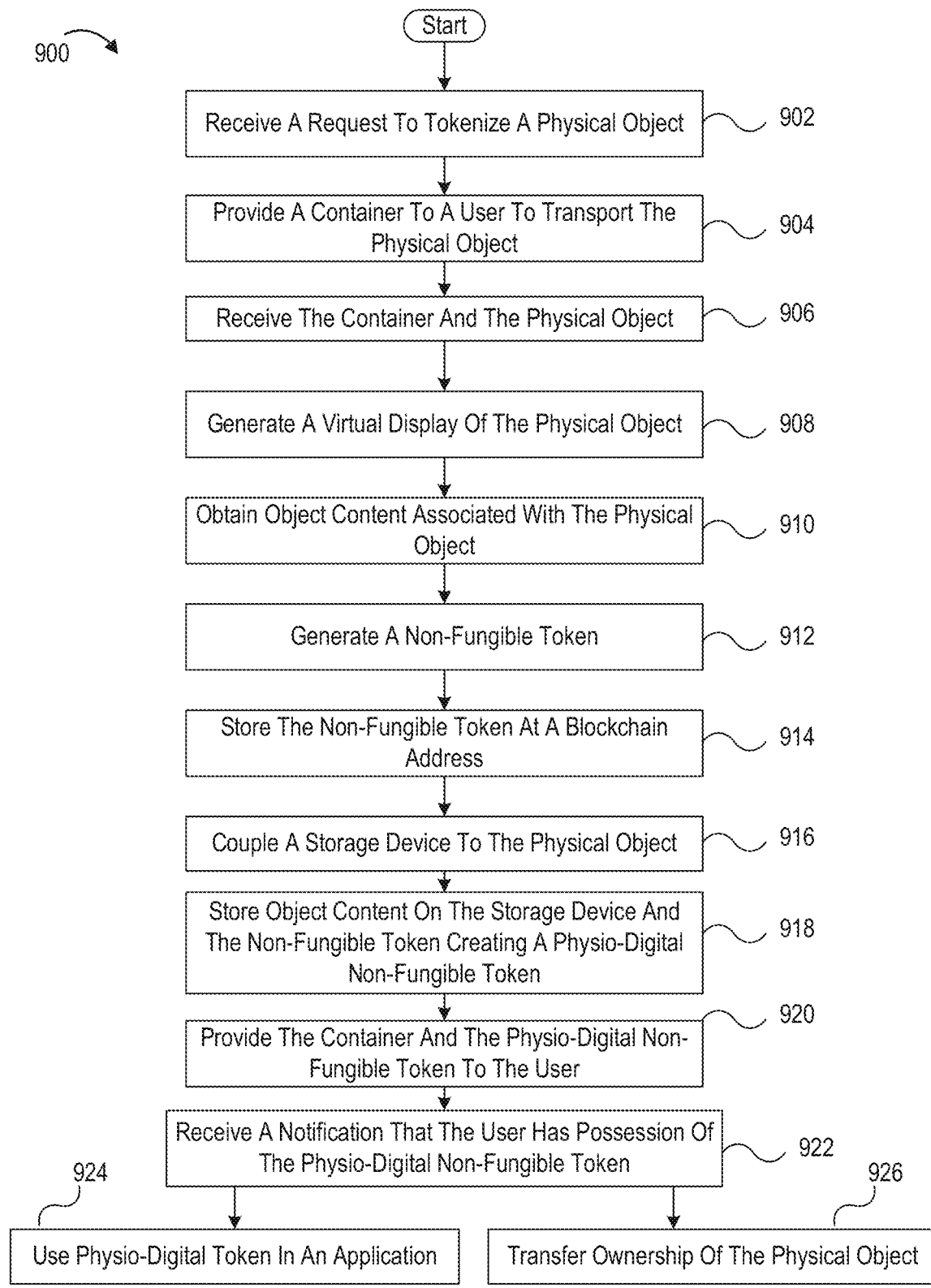
FIG. 9 is a flow diagram showing steps of an example method for physio-digital non-fungible token generation, in accordance with some embodiments of the present disclosure.

Referring now to FIG. 9, a method 900 of physio-digital token generation and use is illustrated. Operations described relative to FIG. 9 may be performed, in various embodiments, by any suitable computer system and/or combination of computer systems, included in physio-digital non-fungible token system 100 of FIG. 1. For convenience and ease of explanation, however, operations described below will simply be discussed relative to the nodes 205b-205e, 205g, and/or 205h or virtual machines hosted by the nodes 205b-205e, 205g, and/or 205h of the blockchain network 200 of FIG. 2, which may be any of the blockchain networks 130a, 130b, and/or 130c of FIG. 1, or the client devices 120 and/or 125 of the physio-digital non-fungible token system 100 of FIG. 1. Also, operations described below may be discussed relative to an IoT device 155 of FIG. 1, which may include the vault device 700 of FIG. 7. Further, various elements of operations discussed below may be modified, omitted, and/or used in a different manner or different order than that indicated. Thus, in some embodiments, one or more of the nodes 205a-205h and/or the client devices 120 and/or 125 may perform one or more aspects described below, while another system might perform one or more other aspects.

The method 900 may begin at step 902 where a request to tokenize a physical object is received. In an embodiment, at step 902 and with reference to FIG. 1, the user 110 may provide a physio-digital tokenization request to a physio-digital tokenization service provider. The physio-digital tokenization request may be provided via a native application and/or a web browser application operated on the client device 120 and through the network 140 such that the physio-digital tokenization controller 804 that is hosted on the server 150/800 and associated with the physio-digital tokenization service provider may receive the physio-digital tokenization request. The physio-digital tokenization request may include user information associated with the user 110. The user information may include physio-digital tokenization service provider identifier, a name, an address, a phone number, an email, and/or any other user information that would be apparent to one of skill in the art in possession of the present disclosure. The physio-digital tokenization request may also include physical object information. The physical object information may include a description of the object, a weight, dimensions, and/or other physical object information that would be apparent to one of skill in the art in possession of the present disclosure.

The method 900 then proceeds to step 904 where the physio-digital tokenization service provider may provide a container to the user. In an embodiment, at step 904, the physio-digital tokenization service provider may ship an IoT device 155, such as the vault device 900, to the user 110 according to the user information provided in the physio-digital tokenization request. The user 110 may receive the vault device 700. The user 110 may position the closure 702b such that the closure 702b is in an open orientation. The user 110 may place the physical object in the vault device 700 such that the chassis 702 houses the physical object in the volume 702a. In various embodiments, the chassis 702 may be configured such that the volume 702a is sized to the dimensions of the physical object according to the physical object information.

In various embodiments, the user 110 may then position the closure 702b to be in a closed orientation. The user 110 may cause the locking system 716 to lock, and thus prevent the closure 702b from moving to an open orientation. Before or after the locking system 716 prevents the closure 702b from moving from the closed orientation to the open orientation, the user 110 may enter authentication information used to unlock and/or lock the locking system 716. For example, the user 110 may enter a password via the I/O system 712, a biometric key (e.g., a facial scan, a fingerprint scan), a gesture, and/or any other authentication information that would be apparent ton one of skill in the art in possession of the present disclosure. In some embodiments, dual authentication or even additional authentication, using two or more of the authentication methods discussed above, may be required. In some embodiments, the physio-digital tokenization service provider may have its own provider authentication information stored on the vault device 700 to lock and/or unlock the locking system 716. In various embodiments, the authentication information entered by the user 110 may be sent via the communication system 706 and network 140 to the server 150 for future use in other processes discussed below. In other embodiments, the locking system 716 may be locked or unlocked using a physical key. While some embodiments are described to lock and/or unlock the locking system 716, one of skill in the art in possession of the present disclosure will recognize that other locking and/or unlocking mechanisms may be contemplated.

In various embodiments, the user 110 may then send the vault device 700 to the physio-digital tokenization service provider. It is noted that step 906 is optional and one of skill in the art in possession of the present disclosure will recognize that the user 110 may provide the physical object to the physio-digital tokenization service provider in various manners that would be recognized by one of skill in the art in possession of the present disclosure.

The method 900 then proceeds to step 906 where the physio-digital tokenization service provider may receive the vault device or otherwise receive the physical object to be tokenized. In an embodiment, at step 906, the physio-digital tokenization service provider may receive the vault device 700 and unlock the locking system 716 on the vault device 700 using the provider authentication information via the I/O system 712 and/or using any other unlocking mechanism that was used to lock the locking system 716 (e.g., a physical key). The physio-digital tokenization service provider may retrieve the physical object from the volume 702a of the vault device 700.

The method 900 then proceeds to step 908 where the physio-digital tokenization service provider generates a virtual display of the physical object. In an embodiment, at step 908, the physio-digital tokenization service provider may use an IoT device 155 such as a scanning device (e.g., a two-dimensional scanner, a three-dimensional scanner), a camera system (e.g., a two-dimensional camera, a three-dimensional camera), a microscope (e.g., a two-dimensional microscope, a three-dimensional microscope) and/or any other device that can capture images of the physical object and process those images or provide those images to the server 150 such that the physio-digital tokenization controller 804 included on the server 150/800 can process those images and generate a virtual display (e.g., a two-dimensional model or a three-dimensional model) of the physical object. As used herein, the virtual display may include a version, a copy, a representation, or a derivative of the physical object and may not necessarily be displayed but may include content that is stored and that may be displayed.

In an example where the physical object is a sports card or other collectable card, the physio-digital tokenization service provider may scan the front and the back of the card. The scanner, the server 150, and/or any other computer device associated with the physio-digital tokenization service provider may construct the virtual display of the card using the front image and the back image.

In some embodiments, the physical object may have been encased in a protective holder (e.g., a graded sports card encasement). In various embodiments, that protective holder may be removed prior to using the scanning device to generate the virtual display.

In various embodiments, the virtual display is stored on the storage system 808 and included in the virtual displays 808*a*. However, in other embodiments, the virtual display may be stored on the blockchain of the blockchain network 130*a*, the blockchain of the blockchain network 130*b*, and/or the blockchain of the blockchain network 130*c*.

The method 900 then proceeds to step 910 where object content associated with physical object is obtained. In an embodiment, at step 910, the physio-digital tokenization controller 804 may obtain object content that is associated with physical object. In various embodiments, object content may include primary content that is obtained directly from the physical object and may include secondary content that can be obtained from the primary content obtained directly from the physical object. For example and with respect to primary content that is obtained directly from the physical object, the physio-digital tokenization controller 804 may include an optical character recognition algorithm and/or a natural language processing algorithm that may automatically recognize and analyze text included on the virtual display of the physical object. The physio-digital tokenization controller 804 may be configured to contextualize the recognized text. In the specific sports card example, the physio-digital tokenization controller 804 may obtain player stats, a player's name associated with the sports card, a brand of the sports card, a year that the sports card was made, a card identifier, and/or any other textual information that would be apparent to one of skill in the art in possession of the present disclosure.

In various embodiments, the primary content that is obtained directly from the physical object may include other content. For example, the physio-digital tokenization controller 804 may include other computer vision algorithms such as an image recognition algorithm that may determine visual content from physical object. For example, the physio-digital tokenization controller 804 may determine what the physical object is, determine content included on the physical object, and/or other content. In the specific sports card example, the physio-digital tokenization controller 804 may obtain a sports player's face, objects displayed on the card, features of the card such as design of the card, team logos or card brand logos, and/or any other information that would be apparent to one of skill in the art in possession of the present disclosure.

In various embodiments, the primary content that is obtained directly from the physical object may include identifying factors that distinguish the physical object from another physical object that is a replica or of the same make and model. In the specific sports card example, many copies of the same sports card may be made each year by the manufacturer. However, these cards may be distributed and handled differently by each individual. Furthermore, variations in manufacturing may create subtle difference in each card as it is produced. As alluded to earlier, grading service providers may analyze a sports card and give it a grading with respect to a condition of the card. In various embodiments, the physio-digital tokenization controller 804 may include the grading machine learning algorithm 804*a* that may automatically grade the physical object (e.g., sports card, comic book, automobile, a piece of artwork, and/or any other collectible or physical object that may benefit from grading its condition). The grading machine learning algorithm 804*a* may look at factors derived from the virtual display. For example and with respect to the sports card example, the grading machine learning algorithm 804*a* may determine a centering condition, a corner condition, an edge condition, a surface condition, and/or any other grading factors that would be apparent to one of skill in the art in possession of the present disclosure. The output of the grading machine learning algorithm 804*a* may include a grading value (e.g., a value out of 1000 or any other value that indicates the condition of the physical object).

In various embodiments, the physio-digital tokenization controller 804 may obtain secondary content that can be obtained using the primary content. In various embodiments, the physio-digital tokenization controller 804 may use the primary content obtained directly from physical object to obtain additional content from a physio-digital tokenization service provider database, a third-party database, and/or any other content source. In the specific sports card example, the physio-digital tokenization controller 804 may obtain the player associated with the sports card and the year from the sports card as primary content and use that information to determine additional content associated with that player during that season. For example, video content associated with the player may be obtained for the season of play associated with the sports card, video content associated with the player from all season, content associated with that player and associated with an application provided by the application controller 805 (e.g., a graphical caricature, abilities, and the like), and/or any other content that would be apparent to one of skill in the art in possession of the present disclosure. In various embodiments, the secondary content obtained may be based on instructions associated with an application provided by the application controller 805. The object content itself or one or more links to a database location on which the object content is stored may be stored in the storage system 808 and included in the virtual display information 808*b*. The object content or a link to the object content may be associated with its virtual display stored in the virtual displays 808*a*.

The method 900 then proceeds to step 912 where the physio-digital non-fungible token is generated according to a token standard. In an embodiment, at step 912, the physio-digital tokenization controller 804 may execute instructions that provide a token generator that generates a non-fungible token that implements a non-fungible tokenization standard. The physio-digital tokenization controller 804 may transfer the private key associated with the non-fungible token to a digital wallet that is associated with the user 110 and that is included in the user accounts 808*c*. However, in other embodiments, the physio-digital tokenization controller 804 may generate or have previously generated a smart contract that is configured to cause a virtual machine of the blockchain network 130*a*-130*c* to generate the non-fungible token upon certain conditions being satisfied. As such, step 912 may include only the generation of a smart contract that is instructed to generate a token at a later point in time when certain conditions have been met. The smart contract may be uploaded or submitted to the blockchain network 130*a* as a transaction according to step 676 of the method 601 that is described in FIG. 6B above such that the method 601 is performed and the non-fungible token is created as a result of step 684 of method 601.

The method 900 then proceeds to step 914 where the non-fungible token is stored at a first blockchain address on a blockchain. In an embodiment, at step 914, the server 150 or the smart contract that generates the non-fungible token may store the non-fungible token on a blockchain. For example, the non-fungible token may be recorded at a blockchain address of the blockchain 220 in the blockchain network 200 of FIG. 2. The entity (e.g., the user 110) that possess the physical corresponding to the blockchain address may access the non-fungible token at the blockchain address.

The method 900 then proceeds to step 916 where a storage device is coupled to the physical object. In an embodiment, at step 916, the physio-digital tokenization service provider may attach or implant a storage device to the physical object. In other embodiments, an encasement coupled to the physical object may include the storage device. In various embodiments, the storage device may include a Radio Frequency Identifier (RFID) chip, an High Frequency (HF) RFID chip, a Ultra High Frequency (UHF) RFID chip (e.g., a UCODE DNA chip manufactured by NXP® Semiconductors N.V., headquartered in Eindhoven, Netherlands), and/or any other storage device that may be apparent to one of skill in the art in possession of the present disclosure.

The method 900 then proceeds to step 918 where information is stored on the storage device. In an embodiment, at step 918, the physio-digital tokenization controller 804, via a storage device writer/reader (e.g., an RFID writer/reader), may store the virtual display, a link to the virtual display, all or a portion of the object content, user information associated with the user 110, a physical object identifier associated with the storage device, a blockchain address of the blockchain 220 on which the non-fungible token associated with the physical object is stored, a smart contract address associated with the physical device, and/or any other information that would be apparent to one of skill in the art in possession of the present disclosure. By storing, on storage device, the non-fungible token and/or a link to the non-fungible token, the physical object is converted into the physio-digital non-fungible token.

The method 900 then proceeds to step 920 where the physio-digital non-fungible token (e.g., the physical object encoded with the non-fungible token) or, in some embodiments, only the physical object with a coupled storage device is provided back to the user. In an embodiment, at step 920, the physio-digital tokenization service provider may return the physio-digital non-fungible token to the user 110. For example, the physio-digital tokenization service provider may return the physio-digital non-fungible token or the physical object with attached storage to the user 110 in the vault device 700. A physio-digital tokenization service provider representative may position the closure 702b such that the closure 702b is in an open orientation. The physio-digital tokenization service provider representative may place the physio-digital non-fungible token or the physical object with attached storage in the vault device 700 such that the chassis 702 houses the physio-digital non-fungible token or the physical object with attached storage in the volume 702a. In various embodiments, the chassis 702 may be configured such that the volume 702a is sized to the dimensions of the physio-digital non-fungible token or the physical object with attached storage according to the physical object information.

In various embodiments, the physio-digital tokenization service provider representative may then position the closure 702b to be in a closed orientation. The physio-digital tokenization service provider representative may cause the locking system 716 to lock, and thus prevent the closure 702b from moving to an open orientation. Before or after the locking system 716 prevents the closure 702b from moving from the closed orientation to the open orientation, the physio-digital tokenization service provider representative may enter the provider authentication information used to unlock and/or lock the locking system 716. For example, the physio-digital tokenization service provider representative may enter a password via the I/O system 712, a biometric key (e.g., a facial scan, a fingerprint scan), a gesture, and/or any other authentication information that would be apparent to one of skill in the art in possession of the present disclosure. The authentication information associated with the user 110 may be stored on the storage system 708 of the vault device 700. In various embodiments, the provider authentication information entered by the physio-digital tokenization service provider representative may be sent via the communication system 706 and the network 140 to the server 150 for future use in other processes discussed below. In other embodiments, the locking system 716 may be locked or unlocked using a physical key. While some embodiments are described to lock and/or unlock the locking system 716, one of skill in the art in possession of the present disclosure will recognize that other locking and/or unlocking mechanisms may be contemplated.

In various embodiments, the physio-digital tokenization service provider representative may then send the vault device 700 to the user 110. It is noted that step 920 is optional and one of skill in the art in possession of the present disclosure will recognize that the physio-digital tokenization service provider may provide the physio-digital non-fungible token or the physical object with attached storage to the user in various manners that would be recognized by one of skill in the art in possession of the present disclosure.

The method 900 then proceeds to step 922 where a notification that the user has possession of the physio-digital non-fungible token or the physical object with attached storage is received. In an embodiment, at step 922, the user 110 may receive the vault device 700 and unlock the locking system 716 on the vault device 700 using the user authentication information via the I/O system 712 and/or using any other unlocking mechanism that was used to lock the locking system 716 (e.g., a physical key). The user 110 may retrieve the physical object from the volume 702a of the vault device 700. In response to the user 110 opening the vault device 700, a notification may be sent via the communication system 706 and the network 140 to the server 150. In various embodiment, the notification may indicate to the physio-digital tokenization controller 804 on the server 150/800 to generate the non-fungible token and create the physio-digital non-fungible token by associating the non-fungible token with the physical object, and to store the non-fungible token associated with the physio-digital non-fungible token on the blockchain 220 and/or the storage device coupled to the physical object, as discussed in steps 912 and 914. Other user information, the object content, the virtual display, any links to the user information, the object content, and/or the virtual display, and/or any other information that would be apparent to one of skill in the art in possession of the present disclosure may be stored as well on the blockchain and/or the storage device. In other embodiments, the notification may be received by a smart contract that is on the blockchain 220. Upon determining that the smart contract includes a condition that requires the notification, then the smart contract code may execute and the non-fungible token may be generated and used to create the physio-digital non-fungible token.

In some embodiments, verifying possession and maintenance of the ownership of the physio-digital non-fungible token may be performed by transferring the physio-digital non-fungible token to a verification device such as another vault device 700, a shelf, a desk, a rack, a book, a binder, a box, and/or other container or storage system. The verification device may be associated with the user, a verified location, and/or the like and that can detect the presence of the physio-digital non-fungible token. The verification device may include a communication system that may report the presence of the physio-digital non-fungible token to a smart contract on the blockchain used for verifying possession and maintenance of the ownership of the physio-digital non-fungible token. Verifying possession may be performed using proof-of-storage techniques or other proving schemes that would be apparent to one of skill in the art in possession of the present disclosure.

The method 900 then proceeds to step 924 where the physio-digital non-fungible token is used in an application. In an embodiment, at step 924, the user via the client device 120 of FIG. 1 may use a native application or a web browser to access an application provided by the application controller 805. The application controller 305 may access any non-fungible tokens associated with the physio-digital non-fungible tokens from the blockchain 220. Once accessed, the virtual display, user information, object content, and/or other information may be obtained from the physio-digital non-fungible token either from the non-fungible token itself or indirectly from links to the information stored with the physio-digital non-fungible token and/or its associated non-fungible token. That information, object content and virtual display may be used by the application controller 805 that runs a viewing application to view the virtual display associated with the physio-digital token.

In other embodiments, the application controller 805 may run a game application and use the virtual display and/or the object content to determine the gameplay of the game. In the specific sports card example, the physio-digital non-fungible tokens may be selected and the user 110 may challenge the user 115 to a match. The game application may select a random game from the season associated with the physio-digital non-fungible token used by user 110 and a random game from the season associated with a physio-digital non-fungible token used by the user 115. As discussed above, the object content may identify the season and associated content. During the match, the game application may use both physio-digital non-fungible tokens and display a video summary of both random games. Each user 110 and 115 may accrue point for the physio-digital non-fungible tokens based on the performances within the randomly selected game from the player's season. The winner of the match based on the accrued points may obtain a cryptocurrency associated with winning the game or wagered by the users 110 and/or 115. While a specific application is described for illustration purposes, one of skill in the art in possession of the present disclosure will recognize other application uses for the physio-digital non-fungible token without departing from the scope of the present disclosure.

The method 900 may also include step 926 where ownership of the physio-digital non-fungible tokens is transferred from a first user to a second user. In an embodiment, at step 926, the client device 120 and/or 125 and/or a smart contract may create a transaction to transfer the physio-digital non-fungible tokens from a first user account of the user 110 to a second user account associated with the user 115 when a transfer condition is satisfied. As such, the physio-digital non-fungible token may be transferred as described above where the user 110 of the physio-digital non-fungible token may send or transfer the physio-digital non-fungible token to a new owner via a blockchain transaction. For example, the user 110 of the physio-digital non-fungible token may sign the transaction corresponding to the transfer of the physio-digital non-fungible token with the private key. When the physio-digital non-fungible token is received by the new owner, the physio-digital non-fungible token may be recorded in the blockchain at the blockchain address of the new owner. Alternatively, in various embodiments of the present disclosure, when a transfer condition is satisfied, a smart contract may be generated.

In various embodiments, the transfer of ownership of the physio-digital non-fungible token is in conjunction with a transfer of ownership of the physical object associated with the non-fungible token. In various embodiments, the transaction of the physical object, the non-fungible token, o the physio-digital non-fungible token may be brokered by the physio-digital tokenization provider. For example, the physio-digital tokenization provider may provide the vault device 700 to the user 110. The user 110 may store the physio-digital non-fungible token in the vault device 700 and lock the vault device using any of the authentication information discussed above. The sensor system 710 included in the vault device may include a storage device reader and/or writer that can detect the presence of the storage device associated with the physical object. The sensor system 710 may obtain the identifiers associated with the physio-digital non-fungible token and compare it to that of the physio-digital non-fungible token identified in the transaction request. A notification that the vault device 700 is locked by the authenticated user and that the correct physical object is included in the volume 702a may result the physio-digital tokenization controller 804 and/or a smart contract associated with the transaction to determine that a relinquishment of possession as occurred by the user 110. The user 110 may ship the vault device to the physio-digital tokenization provider or directly to the user 115. The user 115 may receive the vault device 700 and may use authentication information to access the volume 702a to retrieve the physical object with attached storage or the physio-digital non-fungible token. One or more notifications may be sent to the smart contract and/or the physio-digital tokenization controller 804 indicating that both the sensor system 710 detects the physio-digital non-fungible token and its physical object identifier include in the storage device and that the intended recipient (e.g., the user 115) received the physical object. The smart contract may execute to transfer ownership to the user 115 of the physio-digital non-fungible token and the virtual display and virtual display information (e.g., object content) may transfer from the user account associated with the user 110 to the user account associated with the user 115.

Figure 10:
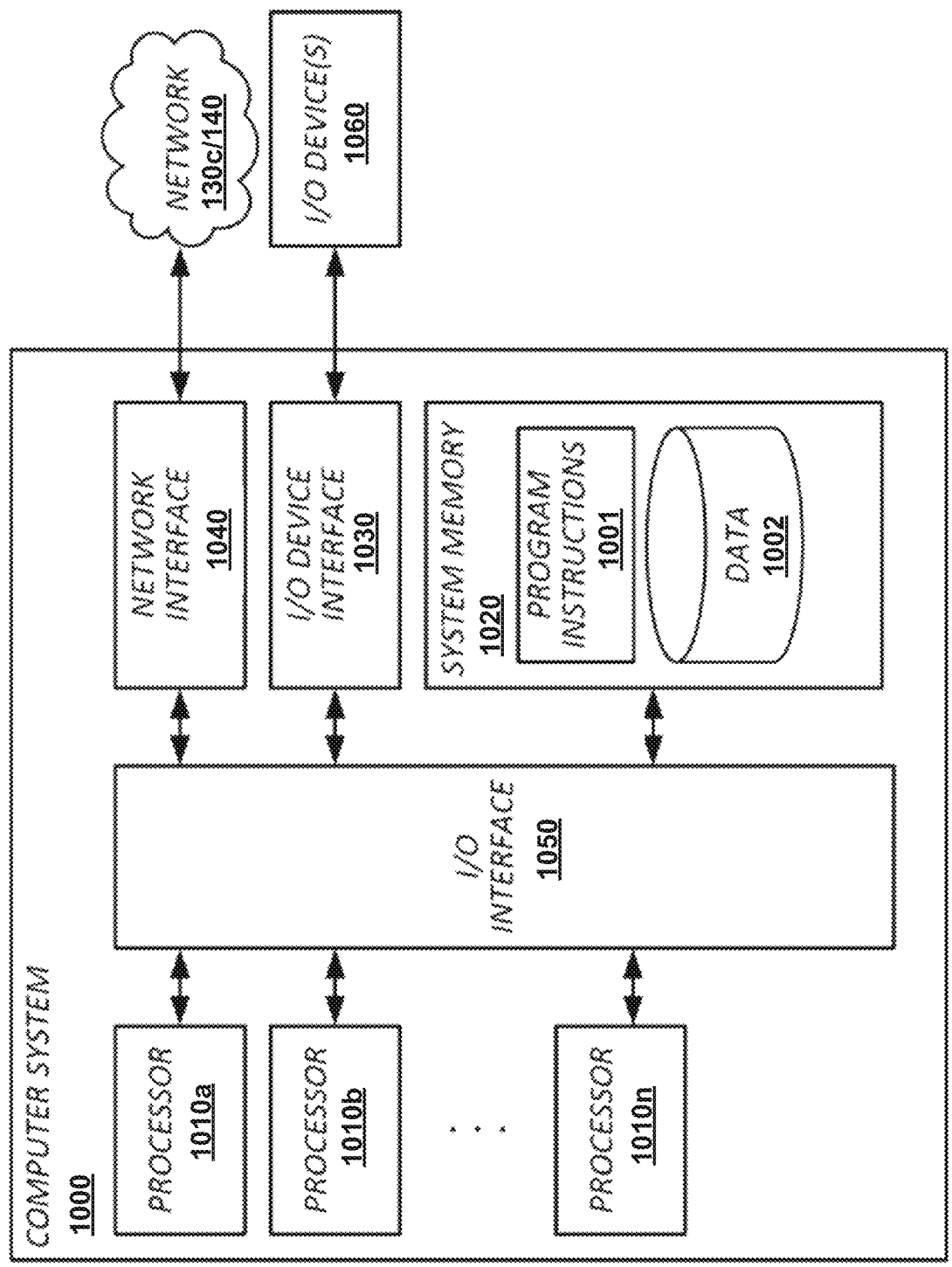
FIG. 10 shows an example of a computing device by which the present techniques may be implemented, in accordance with some embodiments.

FIG. 10 is a diagram that illustrates an exemplary computing system 1000 in accordance with embodiments of the present technique. Various portions of systems and methods described herein, may include or be executed on one or more computer systems similar to computing system 1000. For example, the client devices 120 and 125, the servers 150, 152 and 800, the IoT device 155, and/or the vault device 700 may be provided by the computing system 1000. Further, processes and modules described herein may be executed by one or more processing systems similar to that of computing system 1000.

Computing system 1000 may include one or more processors (e.g., processors 1010*a*-1110*n*) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010*a*-1110*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1001 or data 1002. Program instructions 1001 may be executable by a processor (e.g., one or more of processors 1010*a*-1010*n*) to implement one or more embodiments of the present techniques. Instructions 1001 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010*a*-1110*n*) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010*a*-1010*n*, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010*a*-1010*n*). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A non-transitory, machine-readable medium storing instructions that, when executed by one or more processors, effectuate operations comprising: generating, by a computer system, a non-fungible token according to a non-fungible token standard; associating, by the computer system, a virtual display of a physical object with the non-fungible token; associating, by the computer system, object content associated with the physical object with the non-fungible token; and storing the non-fungible token at a first blockchain address of a first blockchain.

2. The medium of claim 1, wherein the operations further comprise: storing, by the computer system, the virtual display of the physical object on at least one of the first blockchain, a second blockchain, or a storage device.

3. The medium of claim 1, wherein the operations further comprise: storing, by the computer system, an address of a storage location of the virtual display on a storage device coupled to the physical object.

4. The medium of claim 1, wherein the operations further comprise: storing, by the computer system, at least one of an address of a storage location of the object content or at least a portion of the object content on a storage device coupled to the physical object.

5. The medium of claim 1, wherein the virtual display includes a three-dimensional virtual model of the physical object.

6. The medium of claim 1, wherein the operations further comprise: generating, by the computer system, the virtual display of the physical object.

7. The medium of claim 1, wherein the operations further comprise: grading, by the computer system, the physical object using a grading machine learning algorithm on the virtual display of the physical object to obtain a grade value for the physical object.

8. The medium of claim 7, wherein the object content includes the grade value.

9. The medium of claim 1, wherein the operations further comprise: obtaining, by the computer system and using a computer vision algorithm, first content that is expressly presented on the physical object, wherein the object content includes the first content.

10. The medium of claim 9, wherein the first content includes statistical values.

11. The medium of claim 9, wherein the operations further comprise: obtaining, by the computer system, second content that is associated with one or more of the first content, wherein the second content is stored on one or more databases, and wherein the object content includes the second content.

12. The medium of claim 1, wherein the operations further comprise: determining, by the computer system, that one or more conditions have been satisfied before the non-fungible token is activated or stored on the first blockchain address of the first blockchain.

13. The medium of claim 1, wherein the operations further comprise: receiving, by the computer system, a transaction request for a transaction that transfers ownership of the non-fungible token and the physical object from a first user to a second user; receiving, by the computer system, a physical object sent notification indicating that the physical object has been sent by the first user; receiving, by the computer system, a physical object received notification indicating that the physical object has been received by the second user; associating, by the computer system, the ownership of the non-fungible token and the physical object with the second user according to the transaction; and storing the transaction on a second blockchain address of the first blockchain.

14. The medium of claim 13, wherein the associating the ownership of the non-fungible token and the physical object with the second user is in response to a smart contract stored on the first blockchain determining that the physical object sent notification and the physical object received notification have been received.

15. The medium of claim 13, wherein the physical object received notification and the physical object sent notification are sent from a vault device.

16. The medium of claim 15, wherein the vault device is configured to: determine that the physical object is housed in the vault device; determine that the first user that is a current owner of the physical object has completed one or more authentications; send the physical object sent notification when the physical object is housed by the vault device and the first user is authenticated; determine that the second user that is a recipient of the physical object has completed one or more authentications; and send the physical object received notification when the second user has completed the one or more authentications.

17. The medium of claim 1, wherein the operations further comprise: receiving, by the computer system, an application request with a cryptographic key to access the non-fungible token; accessing, by the computer system, the first blockchain address of the first blockchain with the cryptographic key to obtain the non-fungible token; obtaining, by the computer system and using the non-fungible token, the virtual display; and causing, by the computer system, the virtual display to be displayed on a display device.

18. The medium of claim 17, wherein the operations further comprise: obtaining, by the computer system and using the non-fungible token, the object content; and providing, by the computer system, the object content to complete the application request.

19. The medium of claim 1, wherein the operations further comprise steps for generating the non-fungible token according to the non-fungible token standard.

20. A method, comprising: generating, by a computer system, a non-fungible token according to a non-fungible token standard; associating, by the computer system, a virtual display of a physical object on the non-fungible token; associating, by the computer system, object content associated with the physical object on the non-fungible token; storing, by the computer system, the non-fungible token at a first blockchain address of a first blockchain; and storing, by the computer system, the non-fungible token on a storage device coupled to the physical object thereby creating a physio-digital non-fungible token that includes the physical object and the non-fungible token.

21. The method of claim 20, comprising: the operations of any one of embodiments 1-19.

What is claimed is:

1. A non-transitory, machine-readable medium storing instructions that, when executed by one or more processors, effectuate operations comprising:
    generating, by a computer system, a non-fungible token according to a non-fungible token standard;
    associating, by the computer system, the non-fungible token with object content associated with a physical object, wherein the non-fungible token and associated object content is recorded at a first blockchain address of a first blockchain;
    storing, by the computer system and via a storage device writer on a vault device, the non-fungible token on a storage device while the physical object and the storage device coupled to the physical object are housed in the vault device that communicates with a smart contract having a second blockchain address, thereby creating a physio-digital non-fungible token that includes the physical object and the non-fungible token, wherein the smart contract verifies possession and maintenance of ownership of the physio-digital non-fungible token; and
    periodically obtaining, by the computer system, a physio-digital non-fungible token presence notification via a communication system included on the vault device, wherein the physio-digital non-fungible token presence notification indicates that a sensor system housed in the vault device and coupled to the communication system detects a signal associated with the storage device coupled to the physical object.

2. The medium of claim 1, wherein the operations further comprise:
    determining, by the computer system and prior to the generation of the non-fungible token according to the non-fungible token standard, whether the physical object satisfies one or more conditions, wherein the generating the non-fungible token is in response to the physical object satisfying the one or more conditions.

3. The medium of claim 2, wherein a condition of the one or more conditions includes determining that the physical object is housed in the vault device.

4. The medium of claim 3, wherein the vault device is associated with a user that is associated with the physical object.

5. The medium of claim 3, wherein a second condition of the one or more conditions includes determining that a location of the physical object satisfies a geolocation condition and a time condition.

6. The medium of claim 3, wherein a second condition of the one or more conditions includes determining that a biometric authentication satisfies a biometric authentication condition.

7. The medium of claim 1, wherein the operations further comprise;
   receiving, by the computer system, a transaction request for a transaction that transfers ownership of the physio-digital non-fungible token from a first user to a second user;
   receiving, by the computer system, a physical object sent notification indicating that the physical object has been sent by the first user;
   receiving, by the computer system, a physical object received notification indicating that the physical object has been received by the second user, wherein the physical object received notification includes a geolocation and a time stamp;
   associating, by the computer system and in response to verifying the geolocation and the time stamp, the ownership of the non-fungible token and the physical object with the second user according to the transaction; and
   storing the transaction on a third blockchain address of the first blockchain.

8. The medium of claim 7, wherein the physical object received notification and the physical object sent notification are sent from the vault device.

9. The medium of claim 8, wherein the vault device is configured to:
   determine that the physical object is housed in the vault device;
   determine that the first user that is a current owner of the physical object has completed one or more authentications;
   send the physical object sent notification when the physical object is housed by the vault device and the first user is authenticated;
   determine that the second user that is a recipient of the physical object has completed one or more authentications; and
   send the physical object received notification when the second user has completed the one or more authentications.

10. The medium of claim 7, wherein the associating ownership of the non-fungible token and the physical object with the second user according to the transaction is in response to the physical object being housed in a second vault device associated with the second user.

11. The medium of claim 1, wherein the operations further comprise:
    associating, by the computer system, a virtual display of the physical object with the non-fungible token.

12. The medium of claim 11, wherein the operations further comprise:
    storing, by the computer system, an address of a storage location of the virtual display on the storage device coupled to the physical object.

13. The medium of claim 11, wherein the operations further comprise:
    storing, by the computer system, at least one of an address of a storage location of the object content or at least a portion of the object content on the storage device coupled to the physical object.

14. The medium of claim 11, wherein the operations further comprise:
    generating, by the computer system, the virtual display of the physical object.

15. The medium of claim 11, wherein the operations further comprise:
    grading, by the computer system, the physical object using a grading machine learning algorithm on the virtual display of the physical object to obtain a grade value for the physical object.

16. The medium of claim 11, wherein the operations further comprise:
    receiving, by the computer system, an application request with a cryptographic key to access the non-fungible token;
    accessing, by the computer system, the first blockchain address of the first blockchain with the cryptographic key to obtain the non-fungible token;
    obtaining, by the computer system and using the non-fungible token, the virtual display; and
    causing, by the computer system, the virtual display to be displayed on a display device.

17. The medium of claim 16, wherein the operations further comprise:
    obtaining, by the computer system and using the non-fungible token, the object content; and
    providing, by the computer system, the object content to complete the application request.

18. The medium of claim 1, wherein the operations further comprise steps for generating the non-fungible token according to the non-fungible token standard.

19. A method, comprising:
    generating, by a computer system, a non-fungible token according to a non-fungible token standard;
    associating, by the computer system, the non-fungible token with object content associated with a physical object, wherein the non-fungible token and associated object content is recorded at a first blockchain address of a first blockchain;
    storing, by the computer system and via a storage device writer on a vault device, the non-fungible token on a storage device while the physical object and the storage device coupled to the physical object are housed in the vault device that communicates with a smart contract having a second blockchain address, thereby creating a physio-digital non-fungible token that includes the physical object and the non-fungible token, wherein the smart contract verifies possession and maintenance of ownership of the physio-digital non-fungible token; and
    periodically obtaining, by the computer system, a physio-digital non-fungible token presence notification via a communication system included on the vault device, wherein the physio-digital non-fungible token presence notification indicates that a sensor system housed in the vault device and coupled to the communication system detects a signal associated with the storage device coupled to the physical object.

20. The medium of claim 1, wherein the vault device is a portable vault device such that the physio-digital non-fungible token presence notification includes a first geolocation of the vault device determined by a positioning system included in the sensor system and a subsequent physio-digital non-fungible token presence notification includes a second geolocation of the vault device that is different than the first geolocation.

21. The medium of claim 1, wherein the physical object is a collector card and the storage device is embedded into a card encasement that houses the collector card to provide a tamperproof coupling.

22. The method of claim 19, further comprising:
determining that a user associated with the physical object is in possession of the vault device that houses the physical object based on user authentication information obtained by the vault device, wherein the generating the non-fungible token and the storing the non-fungible token on the storage device while the physical object and the storage device coupled to the physical object are housed in the vault device is in response to the determining that the user associated with the physical object is in possession of the vault device that houses the physical object.

\* \* \* \* \*